US010439348B2

(12) United States Patent
Hirai et al.

(10) Patent No.: US 10,439,348 B2
(45) Date of Patent: Oct. 8, 2019

(54) ROTARY CONNECTOR DEVICE

(71) Applicants: FURUKAWA ELECTRIC CO., LTD., Tokyo (JP); FURUKAWA AUTOMOTIVE SYSTEMS INC., Inukami-gun (JP)

(72) Inventors: Shuji Hirai, Inukami-gun (JP); Kazutaka Kamiya, Inukami-gun (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 0 days.

(21) Appl. No.: 16/089,901

(22) PCT Filed: Mar. 29, 2017

(86) PCT No.: PCT/JP2017/013031
§ 371 (c)(1),
(2) Date: Sep. 28, 2018

(87) PCT Pub. No.: WO2017/170752
PCT Pub. Date: Oct. 5, 2017

(65) Prior Publication Data
US 2019/0089109 A1 Mar. 21, 2019

(30) Foreign Application Priority Data

Mar. 31, 2016 (JP) .................. 2016-070567
Mar. 31, 2016 (JP) .................. 2016-070568

(51) Int. Cl.
*H01R 35/04* (2006.01)
*B62D 1/10* (2006.01)
(Continued)

(52) U.S. Cl.
CPC .......... *H01R 35/04* (2013.01); *B60R 16/027* (2013.01); *B62D 1/10* (2013.01); *H01R 13/52* (2013.01)

(58) Field of Classification Search
CPC ..................... B60R 13/027; B60R 16/027
(Continued)

(56) References Cited

U.S. PATENT DOCUMENTS 5,904,585 A 5/1999 Nishikigi et al.
6,409,527 B1 6/2002 Adachi et al.
(Continued)

FOREIGN PATENT DOCUMENTS

JP     5-1190 U    1/1993
JP     9-204972 A  8/1997
(Continued)

OTHER PUBLICATIONS

International Search Report dated Jun. 27, 2018, in PCT/JP2017/013031 filed Mar. 29, 2017.
(Continued)

*Primary Examiner* — Neil Abrams
(74) *Attorney, Agent, or Firm* — Oblon, McClelland, Maier & Neustadt, L.L.P.

(57) ABSTRACT

A rotator, which is configured by an annular top plate and a cylindrically shaped inner peripheral portion, and a stator, which is configured by assembling an annular stator main body and a cylindrically shaped sub stator, are assembled to be relatively rotatable in both a clockwise direction and a counterclockwise direction. An SRC that houses a flat cable being wound inside of a housing space formed therein is provided with a stator locking portion that enables a frame-shaped locking portion that extends from the stator main body to lock with a protruding locking portion that is formed on the sub stator; and a recess-protrusion fitting portion that suppresses the entry of foreign matter into the housing space. The recess-protrusion fitting portion is disposed on an opposing portion that corresponds to the stator locking portion.

12 Claims, 13 Drawing Sheets

(51) Int. Cl.
*B60R 16/027* (2006.01)
*H01R 13/52* (2006.01)

(58) Field of Classification Search
USPC .......................................... 439/164
See application file for complete search history.

(56) References Cited

U.S. PATENT DOCUMENTS

| | | | |
|---|---|---|---|
| 7,104,821 B2* | 9/2006 | Araki .................... | B60R 16/027 439/164 |
| 7,223,104 B2* | 5/2007 | Suenaga ................ | H01R 35/04 439/15 |
| 8,758,024 B2* | 6/2014 | Adachi .................. | H01R 35/04 439/15 |
| 2019/0089109 A1* | 3/2019 | Hirai ....................... | B62D 1/10 |
| 2019/0118738 A1* | 4/2019 | Ushiyama ................ | B62D 1/04 |

FOREIGN PATENT DOCUMENTS

| | | | |
|---|---|---|---|
| JP | 3408922 B2 | 5/2003 |
| JP | 3676146 B2 | 7/2005 |
| JP | 2011-228287 A | 11/2011 |
| JP | 2011-228287 A5 | 11/2011 |

OTHER PUBLICATIONS

Office Action dated Jun. 17, 2019, in Chinese Patent Application No. 201780020993.0, filed Mar. 29, 2017 (with English-language Translation).

* cited by examiner

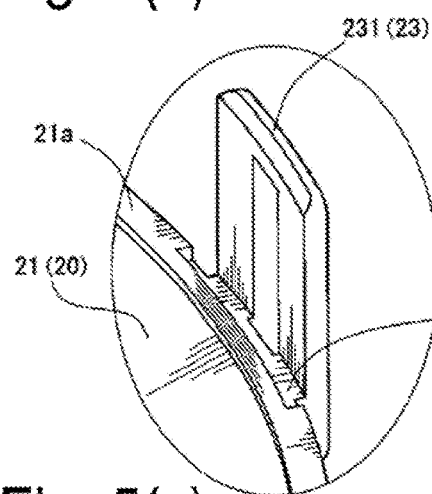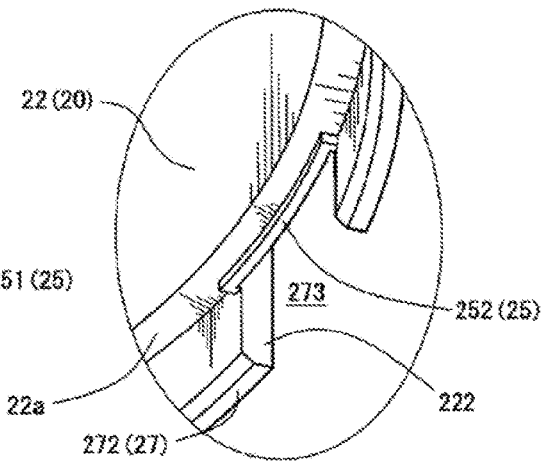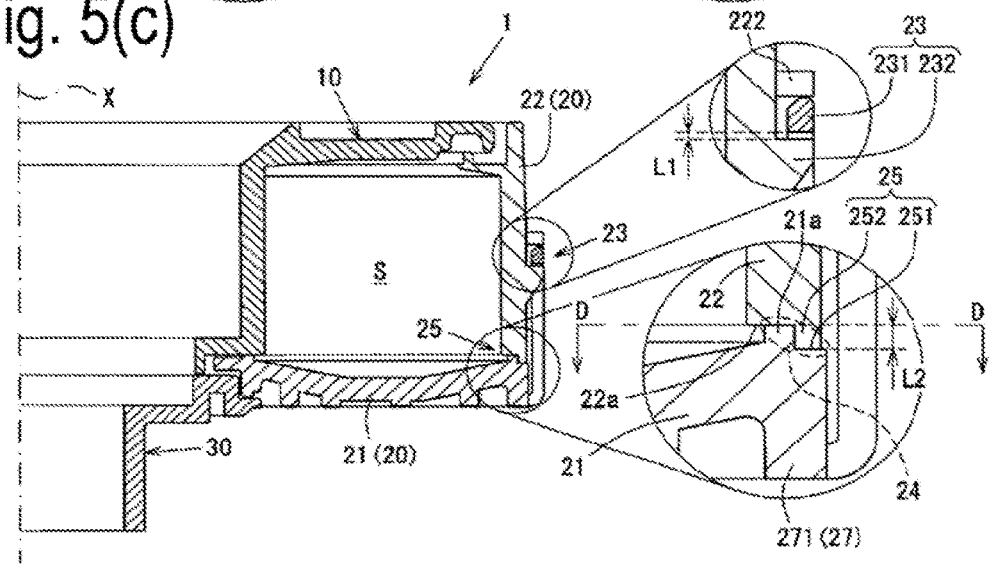

ROTARY CONNECTOR DEVICE

TECHNICAL FIELD

The present invention relates to a rotary connector device to be mounted on a vehicle such as an automobile.

BACKGROUND ART

Rotary connector devices are configured by assembling a stationary body fixed to a steering column and a rotating body that rotates in accordance with the steering of a steering wheel relatively rotatable each other, with a flat cable housed in an annular housing space formed therein.

In rotary connector devices having such a configuration, when foreign matter such as dirt or dust enters the housing space, as the rotating body rotates relative to the fixed body, there is a possibility that the flat cable housed in the housing space may be damaged, or that abnormal noises may be generated.

As one countermeasure, for example, in the rotary connector device described in Patent Document 1, an outer peripheral cylindrical portion of the stationary body has a two-layer structure having a slight gap in the radial direction, and foreign matter that enters from the outside can be guided to the gap in the outer peripheral cylindrical portion of the two-layer structure, such that foreign matter can allegedly be prevented from entering into the housing space through the opposing portion between the stationary body and the rotating body.

In addition, as exemplified, in Patent Document 1, in the rotary connector device, in addition to an opposing portion in which an outer peripheral edge of a stationary side ring plate and a lower end of an outer peripheral cylindrical portion of the fixed body are opposed to each other in the axial direction, by providing a portion extending downward on the radial outer side of the lower end portion of the outer peripheral cylindrical portion and assembling such that the outer peripheral edge and the extending portion overlap in the radial direction, foreign matter is suppressed from entering from the opposing portion between the stationary side ring plate and the outer peripheral cylindrical portion along the radial direction.

However, in the rotary connector device, even in a configuration in which the outer peripheral edge of the stationary side ring plate and the lower end portion of the outer peripheral cylindrical portion overlap in the radial direction as described above, it is still necessary to cut out the lower end portion of the outer peripheral cylindrical portion that corresponds to the locking unit for maintaining the assembled state of the stationary side ring plate and the outer peripheral cylindrical portion.

In the portion corresponding to the cut-out portion; that is, in the portion corresponding to the locking unit, as the stationary side ring plate and the outer peripheral cylindrical portion do not overlap in the radial direction, but oppose each other only in the axial direction, there is a possibility that entry of foreign matter cannot be suppressed.

CITATION LIST

Patent Literature

Patent Document 1: JP 2011-228287 A

SUMMARY OF INVENTION

Technical Problem

Accordingly, an object of the present invention is to provide a rotary connector device capable of suppressing the entry of foreign matter into the housing space through the portion corresponding to the locking unit in the opposing portion between the stationary side ring plate and the outer peripheral cylindrical portion, or that can alternatively prevent the entry of foreign matter into the housing space without an increase in size.

Solution to Problem

The present invention is a rotary connector device in which a rotating body, configured by an annular rotating side ring plate and a cylindrically shaped inner cylindrical portion formed on an inner peripheral edge of the rotating side ring plate, and a stationary body, configured by assembling an annular stationary side ring plate and a cylindrically shaped outer peripheral cylindrical portion abutting against an outer peripheral edge of the stationary side ring plate in an axial direction, are assembled to be relatively rotatable in both a clockwise direction and a counterclockwise direction, and a flat cable being wound is housed in a housing space formed inside, the rotary connector device including a locking portion extending from the stationary side ring plate disposed along an outer peripheral surface of the outer peripheral cylindrical portion, a locking unit that enables locking of an engaging portion formed on the outer peripheral cylindrical portion, and a foreign matter intrusion suppression unit that suppresses entry of foreign matter into the housing space, wherein the foreign matter intrusion suppression unit is disposed at a location corresponding to at least the locking unit of an opposing portion between the stationary side ring plate and the outer peripheral cylindrical portion.

The opposing portion includes, in an assembled state, a state in which the stationary side ring plate and the outer peripheral cylindrical portion are abutting each other, or alternatively, a state in which they are substantially abutting each other such that a slight gap is formed.

The foreign matter includes, for example, dirt, dust, fine sand, or the like.

According to the present invention, the entry of foreign matter into the housing space through a portion corresponding to the locking unit in the opposing portion between the stationary side ring plate and the outer peripheral cylindrical portion can be suppressed.

Specifically, in stationary bodies of the related art, in order to lock the locking portion to the engaging portion, it is necessary to cut out a portion corresponding to the locking portion at the lower end portion of the outer peripheral cylindrical portion, and there is a possibility that the foreign matter may enter from opposing portions that only oppose in the axial direction and that correspond to this cutout portion. However, in the present invention, since the foreign matter intrusion prevention unit is disposed at a position corresponding to at least the locking unit, it is possible to suppress the entry of foreign matter into the housing space through the portion corresponding to the locking unit in the opposing portion.

In this way, in cases in which the flat cable housed in the housing space is wound or unwound in accordance with the relative rotation, it is possible to prevent the flat cable from being damaged or generating abnormal noises due to the foreign matter that has entered into the housing space.

As one aspect of the present invention, the foreign matter intrusion suppression unit can be configured by a fitting protrusion that is formed on at least one of the stationary side ring plate and the outer peripheral cylindrical portion and protrudes toward another one; and a fitting recess that is formed on the other one and that engages with the fitting protrusion.

According to the present invention, a portion that opposes the axial direction and a portion that opposes the radial direction are configured in the opposing portion in the radial cross section along the axial direction. Rather than the opposing portions of the related art that only oppose in the axial direction, in addition to increasing the length of the opposing portion in the radial cross section, it is possible to inflect the intrusion path of foreign matter at a portion corresponding to the locking unit, resulting the entry of foreign matter into the housing space can be reliably suppressed.

Furthermore, the fitting protrusion and the fitting recess which are recess-protrusion fit with each other may also be made to function as a positioning portion when assembling the stationary side ring plate and the outer peripheral cylindrical portion. Further, the mechanical strength in the assembled state is increased, and a stable assembled state of the stationary side ring plate and the outer peripheral cylindrical portion can be obtained.

As another aspect of the present invention, the fitting recess can be formed on the stationary side ring plate, and the fitting protrusion can be formed on the outer peripheral cylindrical portion; and the foreign matter intrusion suppression unit can be disposed at a radial outer side of the opposing portions.

According to the present invention, the opposing portion is formed in a stepped shape in which the radial inner side is located closer to the rotating side ring plate than the radial outer side. In this way, gravity acts on the foreign matter passing through the intermediate portion in the radial direction of the opposing portion, and it is possible to suppress the entry of foreign matter into the housing space.

Accordingly, it is possible to more reliably suppress the entry of foreign matter into the housing space.

As another aspect of the present invention, in a state in which the fitting protrusion and the fitting recess are recess-protrusion fitted to bond with each other in the axial direction, a fitting length of the fitting protrusion and the fitting recess in the axial direction can be formed to be longer than a spacing in the axial direction formed between the locking portion and the engaging portion.

The above-mentioned spacing in the axial direction between the locking portion and the engaging portion refers to a slight spacing in the axial direction provided between the locking portion and the engaging portion in a state in which the stationary body is assembled such that the fitting protrusion and the fitting recess bond with each other in the axial direction and in which the locking portion and the engaging portion are locked. This spacing is required for simplifying locking of the locking unit and releasing of the lock.

According to the present invention, due to assembly variations of the rotary connector device and the like, even in cases when the fitting protrusion and the fitting recess are separated in the amount of the spacing between the locking portion and the engaging portion in the axial direction, the gap formed in the opposing portion is not formed to penetrate toward the housing space in the radial direction, but is maintained in a stepped shape. In this way, it is possible to more reliably suppress the entry of foreign matter into the housing space.

As another aspect of the present invention, a blocking member that blocks the opposing portion in a radial direction can be provided as the foreign matter intrusion suppression unit.

The blocking member is fixed, for example, to a fixing recess formed in the opposing portion between the stationary side ring plate and the outer peripheral cylindrical portion, and includes a stationary blocking member for blocking the opposing portion in the radial direction, a bonding blocking member interposed to bond with the opposing portion and block the opposing portion in the radial direction, or the like. It should be noted that, as a specific bonding blocking member, a packing made of silicone or rubber, or grease or the like may be included, for example.

In addition, the blocking member may be provided at any position in the radial direction of the opposing portion, or may be provided together with the fitting recess or the fitting protrusion. It should be noted that, when provided together with the fitting recess or the fitting protrusion, the blocking member may be disposed at the same position as the fitting recess or the fitting protrusion, or may be disposed side by side with the fitting recess and the fitting protrusion in the radial direction. Furthermore, the fitting recess and the fitting protrusion may be provided on a part of the opposing portion in the circumferential direction, and the blocking member may be provided on another part.

According to the present invention, since the intrusion path through which the foreign matter enters the housing space is blocked in the radial direction, it is possible to reliably prevent entry of foreign matter into the housing space. Accordingly, it is possible to reliably suppress damage to the flat cable and the generation of abnormal noise.

As another aspect of the present invention, a stationary recess can be formed on each opposing surface of the stationary side ring plate and the outer peripheral cylindrical portion, and the blocking member can be configured by a stationary blocking member being fixed to both of the stationary recesses straddling the opposing portion in the axial direction.

According to the present invention, it is possible to reliably block the intrusion path of foreign matter into the housing space, and to reliably prevent the foreign matter from entering the housing space.

As another aspect of the present invention, the stationary blocking member can be configured by a part of the flat cable housed in the housing space.

According to the present invention, it is unnecessary to use a separate member as the stationary blocking member, and the number of parts configuring the rotary connector device can be decreased to reduce the weight.

As another aspect of the present invention, a surrounding portion surrounding a periphery of the locking portion along the outer peripheral surface can be provided on the outer peripheral cylindrical portion.

According to the present invention, it is possible to more reliably prevent the entry of foreign matter into the housing space.

More specifically, as the surrounding portion can prevent the foreign matter from approaching the opposing portion by traveling between the outer peripheral surface of the outer peripheral cylindrical portion and the locking portion, it is possible to reduce the amount of foreign matter entering the housing space from the opposing portion.

Even supposing a case in which the foreign matter reached the opposing portion, as described above, since the foreign matter intrusion suppression unit provided on the opposing portion can suppress the entry of foreign matter that enters the housing space, it is possible to more reliably prevent the entry of foreign matter into the housing space.

The present invention is a rotary connector device in which a rotating body, configured by an annular rotating side ring plate and a cylindrically shaped inner cylindrical portion formed on an inner peripheral edge of the rotating side ring plate, and a stationary body, configured by an annular stationary side ring plate and a cylindrically shaped outer peripheral cylindrical portion formed on an outer peripheral edge of the stationary side ring plate, are assembled to be relatively rotatable in both a clockwise direction and a counterclockwise direction, and a housing space is included therein, the rotary connector device including, an annular rotator side protrusion protruding from the outer peripheral edge portion of the outer peripheral edge side of the rotating side ring plate toward the stationary side ring plate, an annular protruding ring plate protruding to a radial inner side from the stationary side ring plate at an apex side edge portion of an apex side of the outer peripheral edge portion, and an annular stationary side protrusion protruding from the protruding ring plate toward the rotating side ring plate, wherein the apex side edge portion, the rotator side protrusion, and the stationary side protrusion are disposed in the described order from a radial outer side to a radial inner side, the rotator side protrusion is formed with its tip protruding further toward the stationary side ring plate than the apex side edge portion and the tip of the stationary side protrusion, and a protruding length of the rotator side protrusion is formed to be longer than a protruding length of the stationary side protrusion.

The outer peripheral edge portion includes an outer peripheral edge portion protruding in the axial direction of the rotary connector device from the rotating side ring plate or an outer peripheral edge portion formed by a part of the outer peripheral edge side of the rotating side ring plate.

According to the present invention, it is possible to prevent foreign matter such as dirt and dust from entering the housing space without increasing the size of the rotary connector device.

For example, in the rotary connector device described in Patent Document 1, since the outer peripheral cylindrical portion has a two-layer structure for the purpose of preventing the intrusion of foreign matter, it is larger in the radial direction when compared with rotary connector devices of the related art, and is unable to satisfy the demands of the modern automobile industry for further weight reduction and miniaturization of components.

In contrast, by forming the rotator side protrusion such that its tip protrudes further toward the stationary side ring plate than the apex side edge portion and the tip of the stationary side protrusion, since the intrusion path of foreign matter entering from the outside into the housing space extends between the apex side edge portion and the rotator side protrusion toward the stationary side ring plate and is also deflected between the rotator side protrusion and the stationary side protrusion to extend toward the rotating side ring plate side, it is possible to restrict the entry of foreign matter into the housing space directly along the radial direction.

More particularly, since the apex side edge portion is disposed on the radial outer side of the gap between the rotator side protrusion and the protruding ring plate, it is possible to reduce the amount of foreign matter that reaches the rotator side protrusion. Furthermore, even in cases where the foreign matter reaches the rotator side protrusion, since the protruding length of the rotator side protrusion is formed to be longer than the protruding length of the stationary side protrusion, it is possible to restrict the foreign matter from entering into the housing space from the rotator side protrusion.

Even supposing that the foreign matter entered into the housing space side from the rotator side protrusion, the foreign matter needs to overcome the stationary side protrusion that protrudes from the protruding ring plate toward the rotating side ring plate.

By providing such a rotator side protrusion, a protruding ring plate, and a stationary side protrusion, it is possible to prevent the intrusion of foreign matter into the housing space.

In contrast, since the outer peripheral cylindrical portion does not have a two-layer structure as in the related art, but has a single layer structure, it is possible to prevent the entry of the foreign matter into the housing space without increasing the size of the rotary connector device in the radial direction.

In addition, even in a case where the protruding ring plate deflects or vibrates with the base end as a fulcrum, since the protruding length of the rotator side protrusion is formed to be longer than the protruding length of the stationary side protrusion, the rotator side protrusion will abut against the protruding ring plate before the stationary side protrusion abuts against the outer peripheral edge portion.

In this configuration, the location where the rotator side protrusion abuts in the protruding ring plate is a base end side having a smaller deflection amount than the arrangement location of the stationary side protrusion of the protruding ring plate.

Put differently, in a case where the stationary side protrusion and the outer peripheral edge portion abut each other, and in a case where the protruding ring plate and the rotator side protrusion abut each other, since the former abuts with the tip side of the protruding ring plate having a large deflection amount, sliding sounds caused by the relative rotation in the abutting state and abnormal noise such as abutting sounds due to vibration are likely to be generated, and the abnormal noise that is generated here grows louder. For this reason, the protruding length of the rotator side protrusion is formed to be longer than the protruding length of the stationary side protrusion so that the rotator side protrusion abuts with the protruding ring plate before the stationary side protrusion abuts with the outer peripheral edge portion.

In this way, the rotary connector device of the present invention is capable of not only preventing the intrusion of foreign matter into the housing space without an increase in size, but can also prevent the generation of abnormal noise when components are brought to abut each other.

As another aspect of the present invention, the outer peripheral cylindrical portion can be formed to have a height such that the apex portion is substantially equal to the rotation side ring plate.

According to the present invention, it is possible to reliably restrict the intrusion of foreign matter into the housing space from the radial direction, and to prevent the relative rotational performance of the rotary connector device from deteriorating.

Specifically, since the apex of the outer peripheral cylindrical portion formed to have approximately the same height as the rotating side ring plate does not protrude significantly more than the rotating side ring plate, it is possible to prevent the apex of the outer peripheral cylindrical portion of the stationary body fixed to the steering column from interfering with the rotation of the steering wheel.

Furthermore, even in cases when the rotating body relatively tilts with respect to the stationary body, or the rotating body and the stationary body are relatively deformed, by means of the outer peripheral cylindrical portion which is formed to have approximately the same height as the rotating side ring plate, it is possible to prevent the rotator side protrusion from passing over the apex side edge portion and jutting out in the radial outer side or interfering.

In this way, it is possible to prevent the deterioration of the relative rotational performance of the rotary connector device that is capable of preventing interference between the apex of the outer peripheral cylindrical portion and the steering wheel and preventing interference between the apex side edge portion and the rotator side protrusion.

In addition, by means of the outer peripheral cylindrical portion which is formed such that the apex has approximately the same height as the rotating side ring plate, it is possible to restrict the intrusion of foreign matter into the housing space from the radial outer side more reliably than the apex side edge portion.

As described above, the rotary connector device of the present invention can reliably restrict the foreign matter from entering into the housing space from the radial direction, and can prevent deterioration of the relative rotational performance.

As another aspect of the present invention, the protruding ring plate can be formed to have a tapered cross-section being gradually thinning toward a tip.

According to the present invention, since the protruding ring plate becomes easily deflected toward the tip, the protruding ring plate that is abutted and compressed against the rotator side protrusion can reduce the contact resistance by deflecting due to the compressing force.

Accordingly, it is possible to reliably prevent the relative rotational performance of the rotary connector device from deteriorating, and it is also possible to reliably prevent the protruding ring plate from being damaged by the compression of the rotator side protrusion. Furthermore, it is possible to reduce the weight of the protruding ring plate.

As an additional aspect of the present invention, the tip of the rotator side protrusion can be formed in a circular arc cross section.

According to the present invention, even supposing a case in which the rotator side protrusion and the protruding ring plate are in contact with each other, as this is a point-contact state in the radial cross section along the axial direction, it is possible to reliably reduce the contact resistance. Accordingly, it is possible to more reliably prevent the relative rotational performance of the rotary connector device from deteriorating.

Advantageous Effects of Invention

The present invention can provide a rotary connector device capable of suppressing the intrusion of foreign matter into the housing space through the portion corresponding to the locking unit in the opposing portion between the stationary side ring plate and the outer peripheral cylindrical portion, or can prevent the intrusion of foreign matter into the housing space without an increase in size.

BRIEF DESCRIPTION OF DRAWINGS

FIGS. 5(a) to 5(c) are explanatory views of a recess-protrusion fitting portion.

DESCRIPTION OF EMBODIMENTS

An embodiment of the present invention will be described with reference to FIG. 1 to FIG. 8(c).

Figure 1:
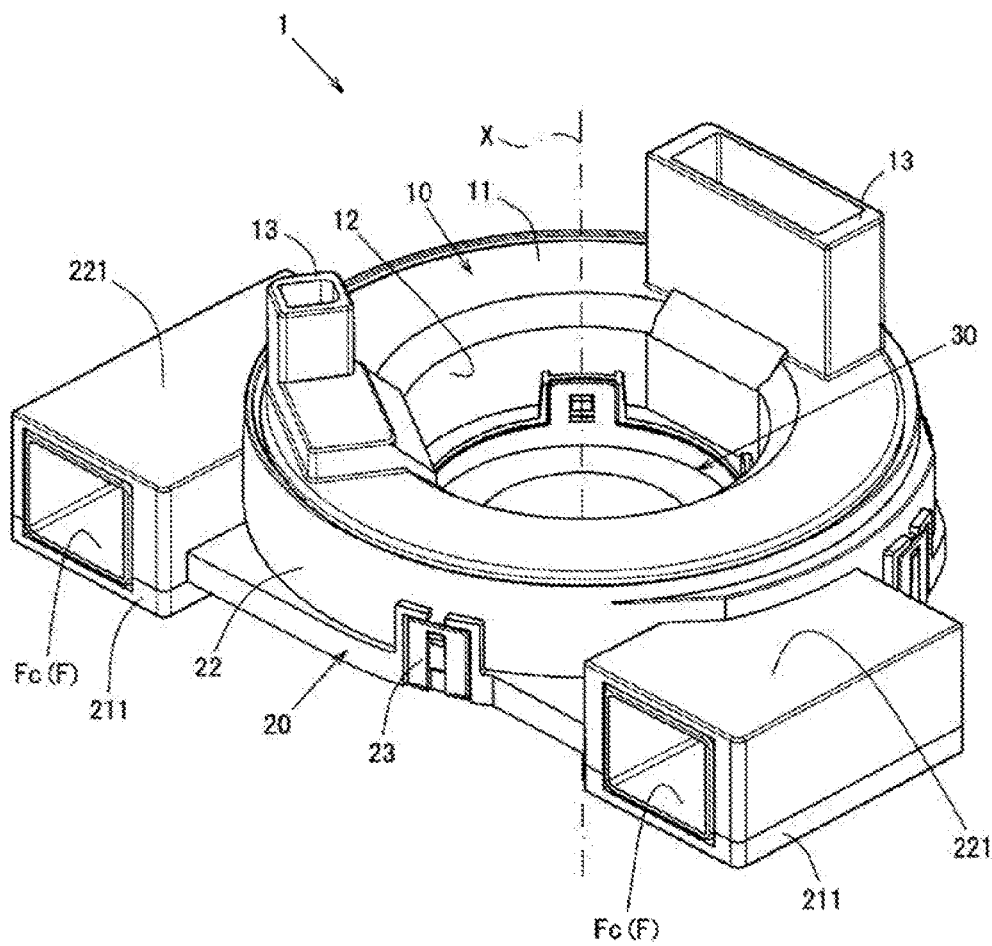
FIG. 1 is a schematic perspective view of a rotary connector device.
Figure 2:
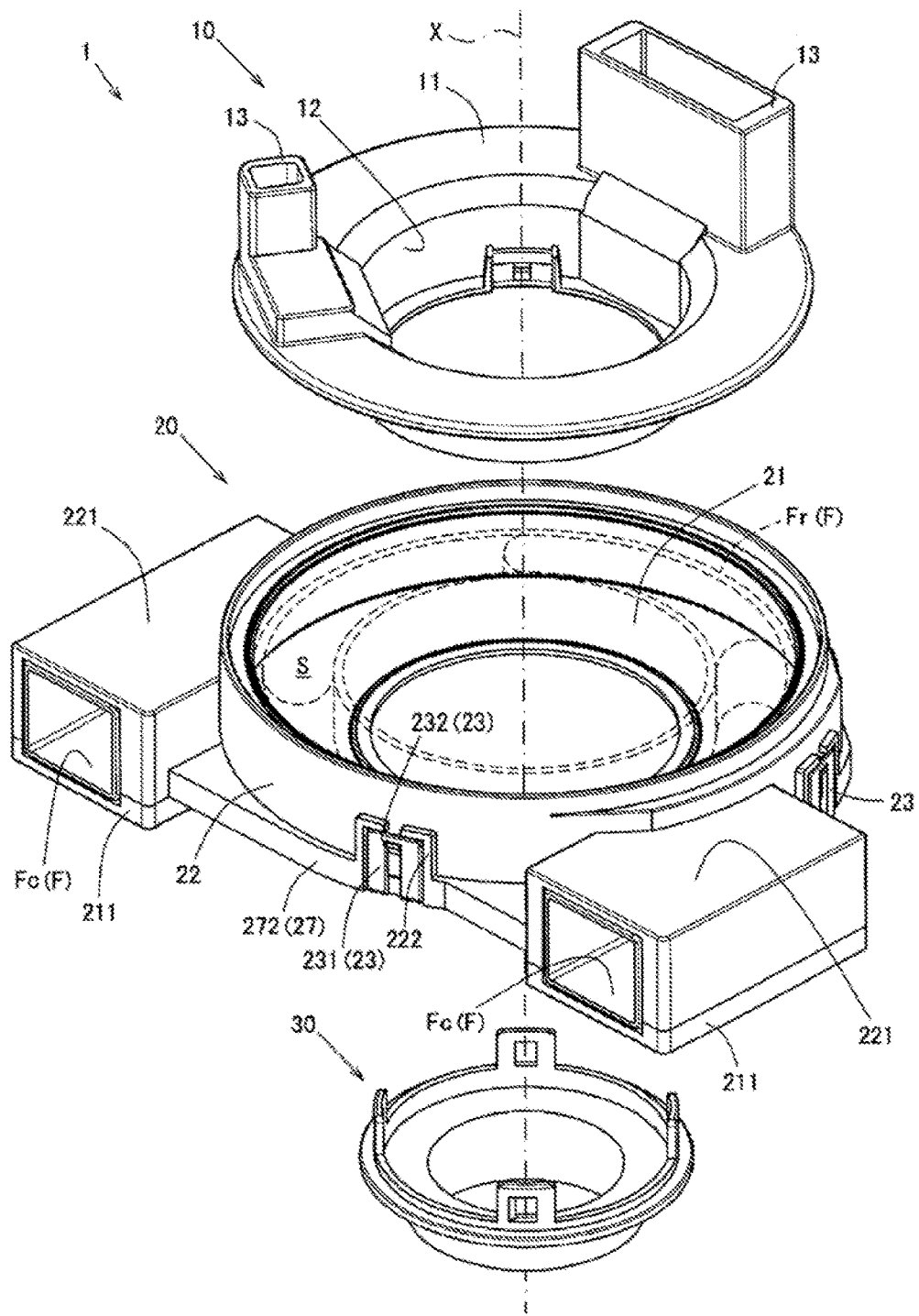
FIG. 2 is a schematic exploded perspective view of the rotary connector device.
Figure 3:
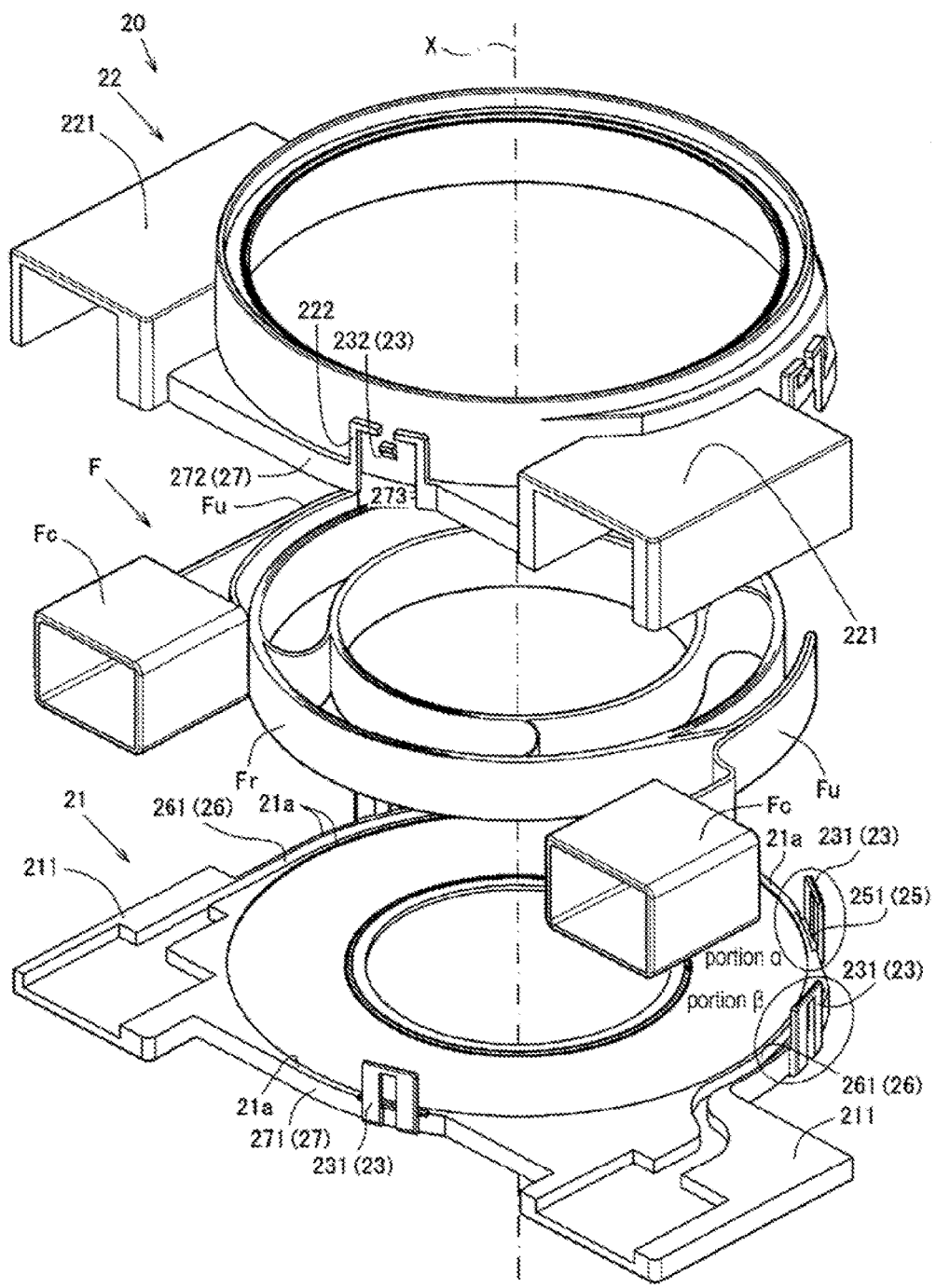
FIG. 3 is a schematic exploded perspective view of a stator.
Figure 4:
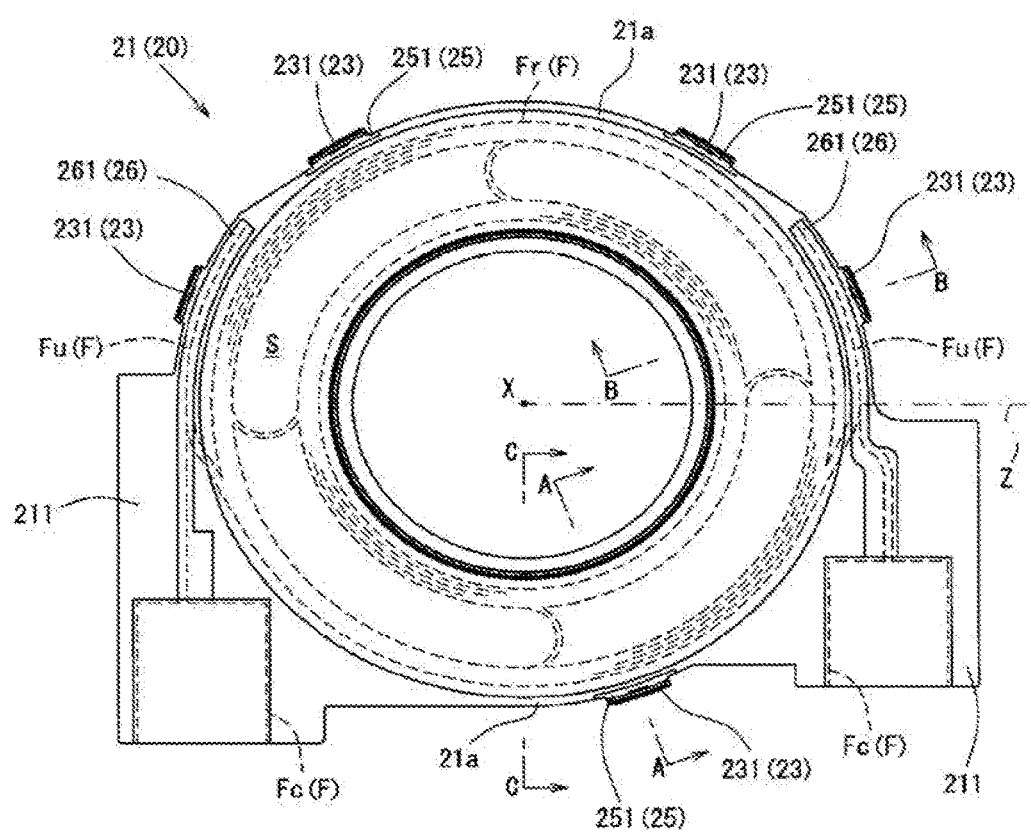
FIG. 4 is a schematic plan view of a stator main body.

FIG. 1 illustrates a schematic perspective view of a rotary connector device 1 (a steering roll connector hereinafter referred to as SRC 1) as viewed from upward, FIG. 2 illustrates a schematic exploded perspective view of the SRC 1 as viewed from upward, FIG. 3 illustrates a schematic exploded perspective view of the stator 20 as viewed from upward, and FIG. 4 illustrates a schematic plan view of a stator main body 21.

FIG. 5(a) to FIG. 5(c) illustrate explanatory views of a recess-protrusion fitting portion 25. Specifically, FIG. 5(a) illustrates a schematic perspective view of the periphery of a main body side fitting recess 251 in which the portion α in FIG. 3 is enlarged, FIG. 5(b) illustrates a schematic perspective view of the periphery of a sub-side fitting protrusion 252 corresponding to FIG. 5(a) as viewed from the downward side of the radial inner side, and FIG. 5(c) illustrates a schematic cross-sectional view of the SRC 1 taken along the line A-A in FIG. 4 and an enlarged view of the periphery of a stator locking portion 23 and the periphery of a recess-protrusion fitting portion 25 in this cross-sectional view.

Figure 6A:
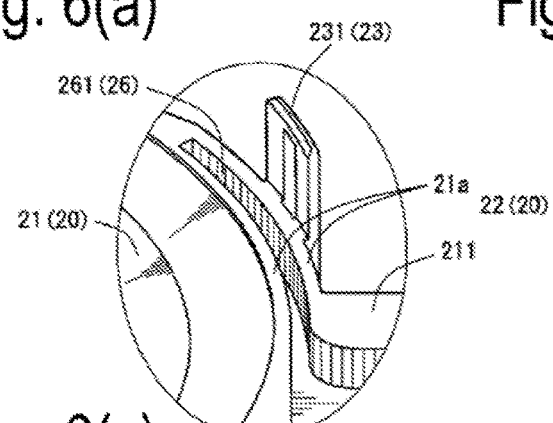
FIGS. 6(a) to 6(c) are explanatory views of a cable fixing portion.
Figure 6B:
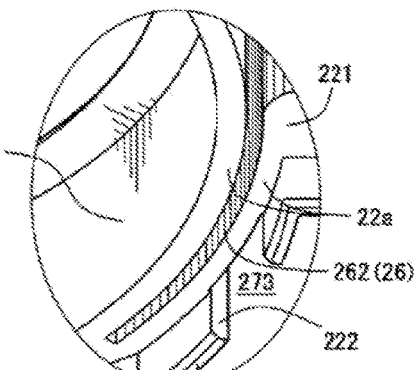
Figure 6C:
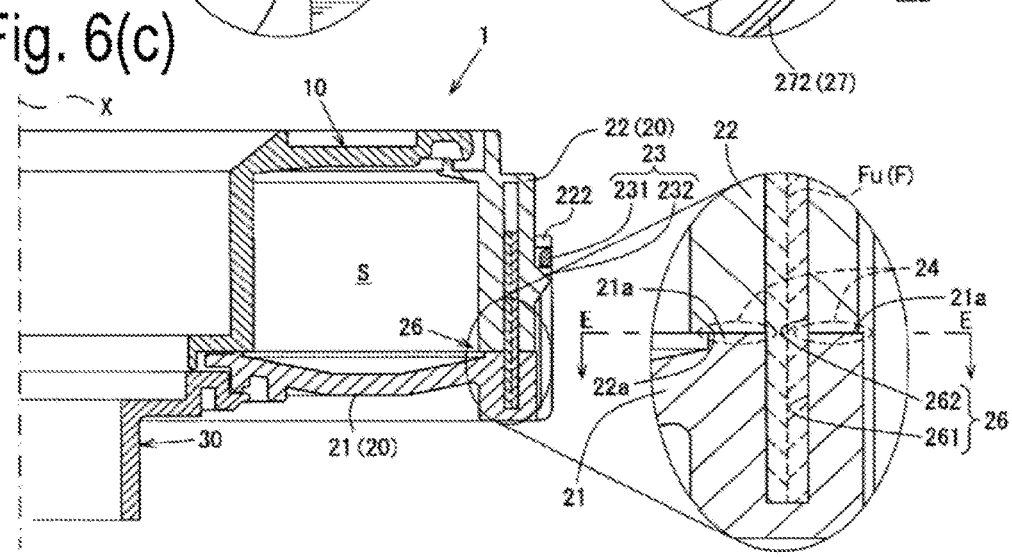

FIG. 6(a) to FIG. 6(c) illustrate explanatory views of a cable fixing portion 26. Specifically, FIG. 6(a) illustrates a schematic perspective view of the periphery of a main body side fixing recess 261 as seen from the upward side of the radial inner side of a portion β in FIG. 3, FIG. 6(b) illustrates a schematic perspective view of the periphery of a sub-side fixing recess 262 corresponding to FIG. 6(a) as viewed from the downward side of the radial inner side, and FIG. 6(c) illustrates a schematic cross-sectional view of the SRC 1 taken along the line B-B in FIG. 4 and an enlarged view of the periphery of the cable fixing portion 26 in this cross-sectional view.

Figure 7:
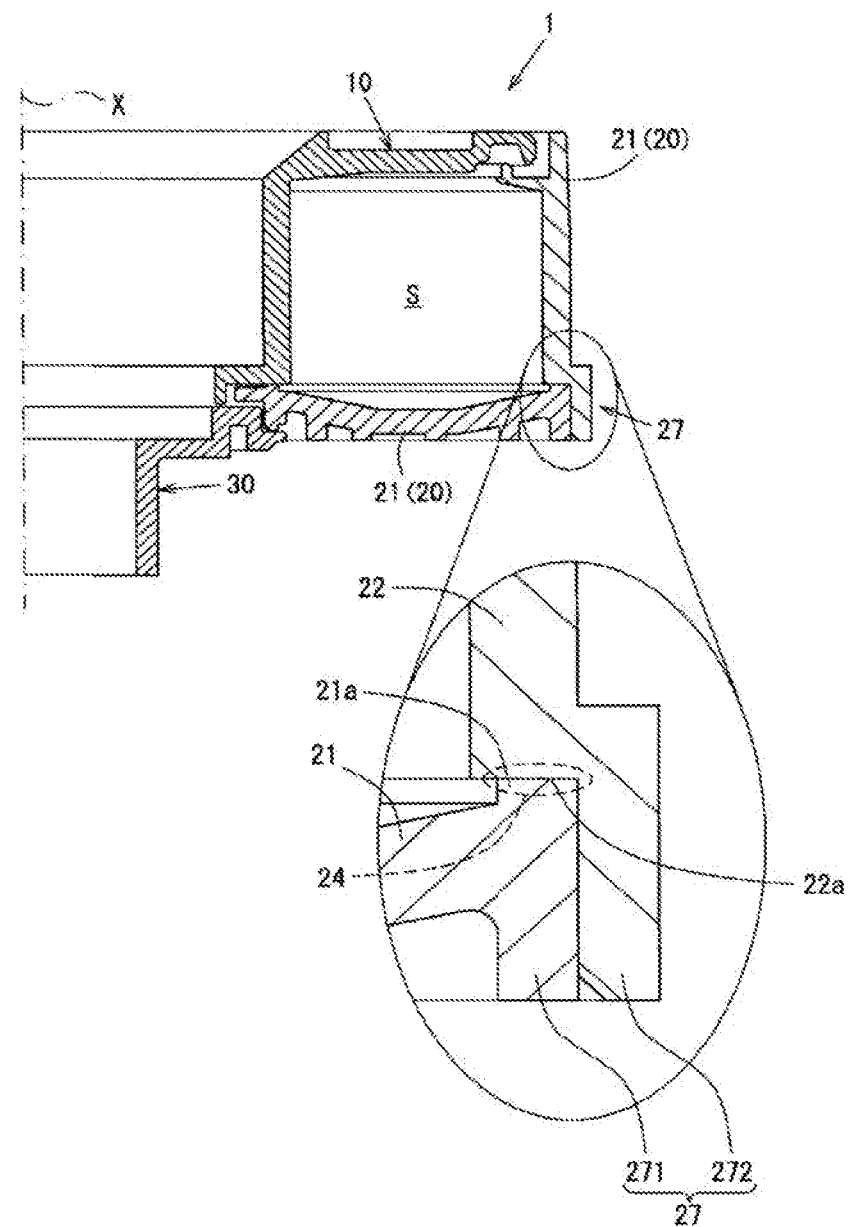
FIG. 7 is a schematic cross-sectional view of an overlapping protrusion.

FIG. 7 illustrates a schematic cross-sectional view of an overlapping protrusion 27. Specifically, FIG. 7 illustrates a schematic cross-sectional view of the SRC 1 taken along the line C-C in FIG. 4 and an enlarged view of the periphery of the overlapping protrusion 27 in this cross-sectional view.

Figure 8A:
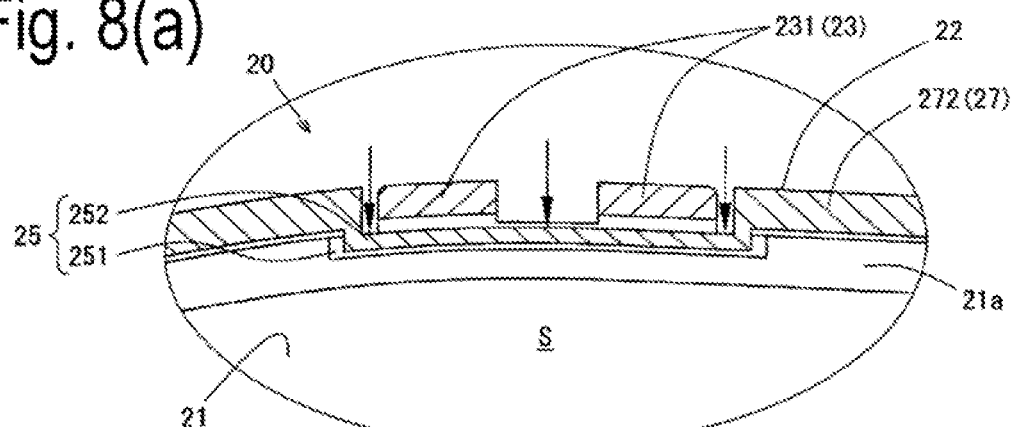
FIGS. 8(a) to 8(c) are explanatory views of the vicinity of a stator locking portion.
Figure 8B:
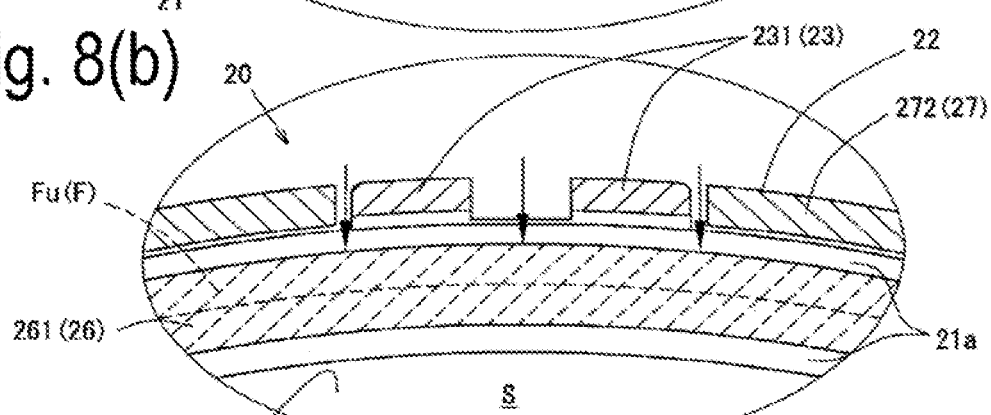
Figure 8C:
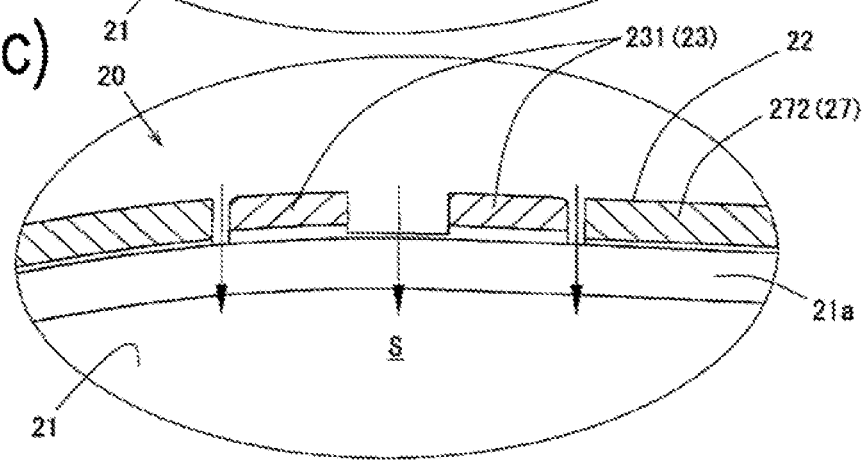

FIG. 8(a) to FIG. 8(c) illustrates explanatory views of the vicinity of the stator locking portion 23. Specifically, FIG. 8(a) illustrates an arrow schematic cross-sectional view taken along D-D in FIG. 5(c) in the vicinity of the stator locking portion 23 of the present embodiment provided with the recess-protrusion fitting portion 25, FIG. 8(b) illustrates an arrow schematic cross-sectional view taken along E-E in FIG. 6(c) in the vicinity of the stator locking portion 23 of the present embodiment provided with the cable fixing portion 26, and FIG. 8(c) illustrates an arrow schematic cross-sectional view taken along D-D in FIG. 5(c) in the vicinity of the stator locking portion 23 in a case in which a recess-protrusion fitting portion is not provided.

It should be noted that FIG. 2 illustrates a winding portion Fr of a flat cable F in a transparent state, and in FIG. 3, in addition to the stator main body 21 and the sub stator 22 that configure the stator 20, a flat cable F in which a first end side that extends to the rotator side connector 13 has been omitted from the drawings is depicted.

In addition, in the present embodiment, with the stator 20 set as a reference, the rotator 10 side is defined as the upward side and the sleeve 30 side is defined as the downward side. Also, in the SRC 1 viewed from upward, the right-side rotation direction is defined as the clockwise direction and the left-side rotation direction is defined as the counterclockwise direction.

As illustrated in FIG. 1 and FIG. 2, the SRC 1 according to the present invention is configured by assembling, in the following order, a rotator 10 that follows the steering of a steering wheel (omitted in the drawings), a stator 20 fixed to the steering column (omitted in the drawings), and a sleeve 30 fixed to the rotator 10 along the central axis X.

In the SRC 1, the rotator 10 and the sleeve 30 are assembled to be relatively rotatable with respect to the stator 20 in both the clockwise direction and the counterclockwise direction with the central axis X as the rotation center, and a flat cable F is housed in an annular housing space S formed therein.

First, the rotator 10, the sleeve 30, and the flat cable F that rotate relative to the stator 20 will be briefly described with reference to FIG. 2 and FIG. 3.

As illustrated in FIG. 2, in the rotator 10, the top plate 11 that configures the upper surface of the SRC 1 and the inner peripheral portion 12 that configures the inner peripheral surface are configured as a single unit, and a rotator side connector 13 that protrudes upward from the upper surface of the top plate 11 is provided.

The top plate 11 that configures the rotator 10 is formed in an annular, substantially flat shape, and the inner peripheral portion 12 is a cylindrical shape extending downward from the inner peripheral edge of the top plate 11.

The rotator side connector 13 houses a connector configuration portion (omitted in the drawings) that is connected to one end of the flat cable F, and is fitted and electrically connected to a connector (omitted in the drawings) of a wire harness connected to the electric circuits of accessories mounted on the steering wheel.

As illustrated in FIG. 2, the sleeve 30 is formed in a substantially cylindrical shape, is disposed on a side opposite to the rotator 10 with respect to the stator 20, and is fixed to the rotator 10 from downward side to interpose the stator 20.

The rotator 10 and the sleeve 30 configured as described above are assembled to be relatively rotatable with respect to the stator 20.

The flat cable F housed in the housing space S is connected at one end to the connector configuration portion housed in the rotator side connector 13, and as illustrated in FIG. 3, a connector Fc fixed to the stator 20 is connected to a second end, and a winding portion Fr wound therebetween is housed in the housing space S.

In the present embodiment, two such flat cables F are used, and are overlapped together with two dummy flat cables.

The connector Fc is fitted and electrically connected to a connector (omitted in the drawings) of the wire harness wired on the steering column side.

As illustrated in FIG. 3, in the flat cable F configured as described above, a loop-back portion Fu is formed in which the second end side to which the connector Fc is connected is looped back and overlapped.

Subsequently, the stator 20 fixed to the steering column will be described in detail with reference to FIG. 2 to FIG. 7.

As illustrated in FIG. 2 and FIG. 3, the stator 20 is configured by assembling a stator main body 21 that configures the bottom surface of the SRC 1 and a sub stator 22 that configures the outer peripheral surface, and the assembled state is maintained by the stator locking portion 23.

In addition, in the assembled state, the stator 20 includes an opposing portion 24 in which the stator main body 21 and the sub stator 22 are mainly opposed in the up-down direction (the direction of the rotation axis X), a recess-protrusion fitting portion 25 that functions as a foreign matter intrusion unit for suppressing the intrusion of foreign matter into the housing space S and a cable fixing portion 26 for fixing the loop-back portion Fu that functions as a foreign matter intrusion restriction unit are formed in the opposing portion 24, and an overlapping protrusion 27 in which the stator main body 21 and the sub stator 22 overlap in the radial direction is provided.

As illustrated in FIG. 3, the stator main body 21 that configures the stator 20 is formed in an annular, substantially flat shape, and is provided with a downward cover portion 211 that covers the downward portion of the connector Fc, a frame-shaped locking portion 231, a main body side fitting recess 251, a main body side fixing recess 261, and a main body side protrusion 271.

A portion protruding slightly upward from the upper surface of the outer peripheral edge of the stator main body 21 is defined as an outer peripheral edge portion 21a.

The downward cover portion 211 is formed to protrude from the stator main body 21 to respectively cover the downward portions of the connectors. Fc disposed in both the left and right directions on the front side of the SRC 1.

In contrast, the sub stator 22 has a cylindrical shape that extends upward from the outer peripheral edge portion 21a of the stator main body 21, and is provided with an upward cover portion 221 that covers the upward side of the connector Fc, a surrounding portion 222 that surrounds the stator locking portion 23, as well as a protruding locking portion 232, a sub-side fitting protrusion 252, a sub-side fixing recess 262, and a sub-side protrusion 272 to be described later.

The bottom surface 22a of the sub stator 22 opposes the outer peripheral edge portion 21a in the up-down direction (the direction of the central axis X) in the assembled state of the stator 20.

The upward cover portion 221 is opposed to the downward cover portion 211 in the up-down direction (the direction of the central axis X), and is formed to protrude from the stator main body 21 to cover the upward portion of each connector Fc.

The surrounding portion 222 is formed to surround the frame-shaped locking portion 231 of the stator locking portion 23 described later along the outer peripheral surface of the sub stator 22.

Specifically, in the surrounding portion 222, the inner side in the circumferential direction is a frame-shape with respect to the outer diameter of the frame-shaped locking portion 231, and the surrounding portion 222 surrounds three directions including an upper portion that excludes the upward center of the frame-shaped locking portion 231, and both side portions of the circumferential direction. Put differently, the surrounding portion 222 is formed in an inverted letter L shape, and is arranged in a left-right symmetrical shape interposing the stator locking portion 23 in the circumferential direction.

As illustrated in FIG. 3, the stator locking portion 23 that maintains the assembled state of the stator 20 is erected facing upward from the outer peripheral edge of the stator main body 21, and that enables locking of a frame-shaped locking portion 231 that has a substantially rectangular frame-shape when viewed from the radial outer side and a protruding locking portion 232 that is formed to protrude from the outer peripheral surface of the sub stator 22 to a radial outer side.

In the plan view of the stator main body 21 illustrated in FIG. 4, when an imaginary line Z extending to the right from the central axis X is set as 0 degree, a total of five stator locking portions 23 are respectively disposed at each of approximately a 20 degree location, approximately a 60 degree location, approximately a 120 degree location, approximately a 160 degree location, and at approximately a 290 degree location from the imaginary line Z in the counterclockwise direction with the central axis X serving as the rotation center.

As illustrated in FIG. 5(c), in a state in which the stator 20 is assembled such that the main body side fitting recess 251 described later and the sub-side fitting protrusion 252 are in contact with each other, the stator locking portions 23 configured in this way are configured by the frame-shaped locking portion 231 and the protruding locking portion 232, which are arranged with a slight spacing L1 therebetween in the up-down direction (the direction of the central axis X). In this way, locking and releasing of the lock between the frame-shaped locking portion 231 and the protruding locking portion 232 can be easily performed.

The opposing portion 24 that opposes the up-down direction (the direction of the central axis X) is configured by the outer peripheral edge portion 21a of the stator main body 21 and the bottom surface 22a of the sub stator 22. A recess-protrusion fitting portion 25 that recess-protrusion fits the outer peripheral edge portion 21a and the bottom surface 22a and a cable fixing portion 26 for fixing the loop-back portion Fu of the flat cable F are formed on a portion corresponding to the stator locking portion 23.

As illustrated in FIG. 5(a) and FIG. 5(b), the recess-protrusion fitting portion 25 that functions as the foreign matter intrusion suppression unit that enables recess-protrusion fitting of the main body side fitting recess 251 in which the outer peripheral edge portion 21a of the stator main body 21 is recessed and the sub-side fitting protrusion 252 having a convex shape in which the bottom surface 22a of the sub stator 22 protrudes.

At the outer peripheral edge portion 21a on the radial inner side of the frame-shaped locking portion 231, the main body side fitting recess 251 is formed in a groove shape that is recessed in a concave shape with a predetermined depth, has a width of approximately half of the outer peripheral edge portion 21a, and a length longer than the circumferential direction length of the frame-shaped locking portion 231. It should be noted that the predetermined depth is defined as a fitting length L2, and the fitting length L2 is longer than the spacing L1 between the frame-shaped locking portion 231 and the protruding locking portion 232 (L1<L2).

The sub-side fitting protrusion 252 which recess-protrusion fits with the main body side fitting recess 251 projects by the fitting length L2 toward the main body side fitting recess 261 is formed in a convex shape corresponding to the main body side fitting recess 251, and both end sides in the circumferential direction are connected to the sub-side fitting protrusion 272 of the overlapping protrusion 27 described later.

As illustrated in FIG. 5(c), the main body side fitting recess 251 and the sub-side fitting protrusion 252 are disposed on the radial outer side of the opposing portion 24 that corresponds to the frame-shaped locking portion 231.

That is, in the assembled state of the stator 20, in the recess-protrusion fitting portion 25 configured by the main body side fitting recess 251 and the sub-side fitting protrusion 252, the radial inner side and the radial outer side of the opposing portion 24 differ from each other by the fitting length L2 in the up-down direction (the direction of the central axis X).

Specifically, the opposing portion 24 that corresponds to the recess-protrusion fitting portion 25 is inflection-formed to have a stepped shape such that the side closer to the approximate center of the radial direction is positioned higher than the radial outer side by the fitting length L2. In this way, by adding the fitting length L2 in the up-down direction (the direction of the central axis X) that opposes the radial direction to the length in the radial direction that opposes the up-down direction (the direction of the central axis X), the length in the radial cross section of the opposing portion 24 that corresponds to the recess-protrusion fitting portion 25 is longer than the lengths in the radial cross section of opposing portions of the related art which are simply opposed in the up-down direction (the direction of the central axis X), and whose lengths in the radial direction substantially coincide with the plate thickness of the sub stator.

As illustrated in FIG. 4, a recess-protrusion fitting portion 25 configured as described above is respectively disposed at each of approximately a 60 degree location, approximately a 120 degree location, and at approximately a 290 degree location from the imaginary line Z in the counterclockwise direction with the central axis X serving as the rotation center.

As illustrated in FIG. 6(a) and FIG. 6(b), the cable fixing portion 26 which fixes the loop-back portion Fu that functions as the foreign matter intrusion suppression unit is configured by the main body side fitting recess 261 in which the outer peripheral edge portion 21a of the stator main body 21 is recessed and the sub-side fixing recess 262 having a concave shape in which the bottom surface 22a of the sub stator 22 is recessed.

As illustrated in FIG. 6(c), each of the fixing recesses 261 and 262 is formed in a rectangular shape in the radial cross section, and is formed to have a width equal to the width of the loop-back portion Fu of the flat cable F; that is, the thickness of two flat cables F.

Each of these fixing recesses 261 and 262 is respectively formed along the circumferential direction, and as they are similarly formed at locations opposing each other in the assembled state of the stator 20, hereinafter, the main body side fixing recess 261 will be described in detail, and a detailed description of the sub-side fixing recess 262 will be omitted.

As illustrated in FIG. 4, the main body side fixing recess 261 extends from the right-side downward cover portion 211 formed on the stator main body 21 to a position of approximately 45 degrees in the counterclockwise direction from the imaginary line Z with the central axis X serving as the rotation center, and the main body side fixing recess 261 formed on the left side has a shape that is substantially left-right symmetrical with the right-side main body side fixing recess 261.

That is, each of the main body side fixing recesses 261 is formed to straddle the frame-shaped locking portions 231 arranged at positions of approximately 20 degrees or approximately 160 degrees in the circumferential direction, and the base end side communicates with each downward cover portion 211.

Accordingly, in the assembled state of the flat cable F and the stator 20, the cable fixing portion 26 can fix, without sliding, the loop-back portion Fu to straddle the frame-shaped locking portions 231 arranged at the positions of approximately 20 degrees or approximately 160 degrees in the circumferential direction.

As illustrated in FIG. 7, the overlapping protrusion 27 that overlaps in the radial direction is configured by a main body side protrusion 271 that protrudes downward from the outer peripheral edge of the stator main body 21 and a sub-side protrusion 272 that protrudes downward from the radial outer side of the lower end of the sub stator 22.

The main body side protrusion 271 protrudes downward from the bottom surface of the outer peripheral edge of the stator main body 21, and is formed on the entire periphery of the stator main body 21.

In contrast, the sub-side protrusion 272 protrudes to the radial outer side from the lower end of the sub stator 22, is formed in a substantial L-shape in a radial cross section protruding downward, and is formed on the entire periphery of the sub stator 22.

That is, the sub-side protrusion 272 is disposed on the radial outer side of the opposing portion 24.

In addition, as illustrated in FIG. 5(b) and FIG. 6(b), in the sub-side protrusion 272, a notch portion 273 formed by cutting out a portion corresponding to the frame-shaped locking portion 231 is formed.

The rotator 10, the stator 20, and the sleeve 30 which are configured as described above are assembled, and in the SRC 1 that houses the flat cable F in the housing space S, the frame-shaped locking portion 231 that configures the stator locking portion 23 passes through the notch portion 273 and locks with the protruding locking portion 232 so that the assembled state is maintained.

The SRC 1 of the present embodiment that is configured as described above is provided with a recess-protrusion fitting portion 25, and the loop-back portion Fu is fixed to the cable fixing portion 26. By arranging the recess-protrusion fitting portion 25 and the loop-back portion Fu at positions corresponding to the stator locking portion 23 in the opposing portion 24 between the stator main body 21 and the sub stator 22, foreign matter such as dirt, dust, or fine sand can be suppressed from entering the housing space S through the portion corresponding to the stator locking portion 23 in the opposing portion 24.

Specifically, although the overlapping protrusion 27 is provided over the entire periphery of the stator 20 except for the frame-shaped locking portion 231 in order to prevent the foreign matter from entering the housing space S from the radial direction through the opposing portion 24, a notch portion 273 is provided in a portion corresponding to the frame-shaped locking portion 231 in the main body side protrusion 271, and as indicated by the arrow in FIG. 8(c), there is a possibility that the foreign matter may enter the housing space S through the notch portion 273 corresponding to the frame-shaped locking portion 231 (the stator locking portion 23) in the opposing portion 24.

With respect to this, by disposing the recess-protrusion fitting portion 25 on the opposing portion 24 that corresponds to the stator locking portion 23, in the portion corresponding to the notch portion 273, not only does the length of the opposing portion 24 in the radial cross section increase more than in opposing portions of the related art which simply oppose in the up-down direction (the direction of the central axis X), but the opposing portion 24 is inflection-formed in a stepped shape in the up-down direction (the direction of the central axis X), and further, the sub-side fitting protrusion 252 is connected to the sub-side fitting protrusion 272.

That is, the intrusion path through which the foreign matter enters from the outside into the housing space S can be inflected and extended in the radial cross section, and as indicated by the arrow in FIG. 8(a), the portion corresponding to the notch portion 273 can be restricted in the radial direction.

In addition, by fixing the loop-back portion Fu to the cable fixing portion 26 in such a manner to straddle the stator locking portion 23 in the circumferential direction and straddle the opposing portion 24 in the up-down direction (the direction of the central axis X), it is possible to reliably block the intrusion path of the foreign matter into the housing space S as indicated by the arrow in FIG. 8(b).

Accordingly, it is possible to more effectively prevent the foreign matter from entering the housing space S through the portion of the opposing portion 24 corresponding to the stator locking portion 23 than in SRC 1 of the related art that are not provided with a recess-protrusion fitting portion 25 or a loop-back portion Fu on the portion corresponding to the stator locking portion 23 in the opposing portion 24; that is, the portion corresponding to the notch portion 273.

In this way, even in cases in which the winding portion Fr of the flat cable F housed in the housing space S is wound or unwound in accordance with the relative rotation of the rotator 10 with respect to the stator 20, it is possible to prevent the flat cable from being damaged or generating abnormal noises due to the foreign matter that has entered into the housing space S.

Furthermore, the main body side fitting recess 251 and the sub-side fitting protrusion 252 which are recess-protrusion fit with each other can be made to function as a positioning portion when assembling the stator main body 21 and the sub stator 22. Further, the assembling strength in the assembled state is increased, and a stable assembled state of the stator main body 21 and the sub stator 22 can be obtained.

In addition, in the present embodiment, by disposing the recess-protrusion fitting portion 25 on the radial outer side of the opposing portion 24, the radial inner side of the opposing portion 24 is formed in a stepped shape that is positioned upward than the radial outer side, and it is possible to use gravity to suppress the entry of the foreign matter into the housing space S in the portion opposing the radial direction at the substantial center in the radial direction of the opposing portion 24.

Accordingly, it is possible to more reliably suppress the entry of the foreign matter into the housing space S.

In addition, in the present embodiment, in a state in which the main body side fitting recess 251 and the sub-side fitting protrusion 252 are in contact with each other in the up-down direction (the direction of the central axis X), by forming the fitting length L2 at which the main body side fitting recess 251 and the sub-side fitting protrusion 252 are fit to be longer than the spacing LI in the up-down direction (the direction of the central axis X) between the frame-shaped locking portion 231 and the protruding locking portion 232 (L1<L2), entry of the foreign matter into the housing space S can be more reliably suppressed.

Specifically, due to assembly variation of the SRC 1 or the like, even in a case where the main body side fitting recess 251 and the sub-side fitting protrusion 252 are separated by the spacing L1 between the frame-shaped locking portion 231 and the protruding locking portion 232 in the up-down direction (the direction of the central axis X), the gap formed in the opposing portion 24 is not formed to penetrate toward the housing space S in the radial direction, but is maintained in a stepped shape. In this way, it is possible to more reliably suppress the entry of the foreign matter into the housing space S.

In addition, in the present embodiment, by fixing the loop-back portion Fu of the flat cable F, which is one of the constituent components of the SRC 1, to the cable fixing portion 26 and using it as a blocking member, it is unnecessary to use a separate member in order to block the intrusion path of foreign matter, and the number of parts configuring the SRC 1 can be decreased to reduce the weight.

In addition, in the present embodiment, by providing the surrounding portion 222 that surrounds the periphery of the frame-shaped locking portion 231 along the outer peripheral surface in the sub stator 22, it is possible to more reliably prevent the foreign matter from entering the housing space S.

Specifically, as the surrounding portion 222 can prevent the foreign matter from approaching the opposing portion 24 by traveling between the outer peripheral surface of the sub stator 22 and the frame-shaped locking portion 231, it is possible to reduce the amount of foreign matter that enters the housing space S from the opposing portion 24.

Even supposing a case in which the foreign matter reached the opposing portion 24, since the recess-protrusion fitting portion 25 provided in the opposing portion 24 and the loop-back portion Fu fixed to the cable fixing portion 26 can suppress the entry of foreign matter that enters the housing space S, it is possible to more reliably prevent the entry of foreign matter into the housing space S.

In the correspondence between the configuration of the present invention and the above-described embodiment, the rotary connector device of the present invention corresponds to the SRC 1 of the embodiment, and similarly:

the rotating body corresponds to the rotator 10, the rotating side ring plate corresponds to the top plate 11, the inner cylindrical portion corresponds to the inner peripheral portion 12, the stationary body corresponds to the stator 20, the stationary side ring plate corresponds to the stator main body 21, the outer peripheral cylindrical portion corresponds to the sub stator 22 the locking unit corresponds to the stator locking portion 23, the locking portion corresponds to the frame-shaped locking portion 231, the engaging portion corresponds to the protruding locking portion 232, the foreign matter intrusion restriction unit corresponds to the recess-protrusion fitting portion 25, the fitting recess corresponds to the main body side fitting recess 251, the fitting protrusion corresponds to the sub-side fitting protrusion 252, the fixing recesses correspond to the cable fixing portion 26, the main body side fixing recess 261, and the sub-side fixing recess 262, the spacing in the axial direction between the locking portion and the engaging portion corresponds to the spacing L1, the length of fitting in the axial direction of the fitting protrusion and the fitting recess corresponds to the fitting length L2, and the foreign matter intrusion restriction unit, the blocking portion, and the fixed blocking member correspond to the loop-back portion Fu, but the present invention is not limited only to the configuration of the above-described embodiment, and many embodiments can be obtained.

Figure 9:
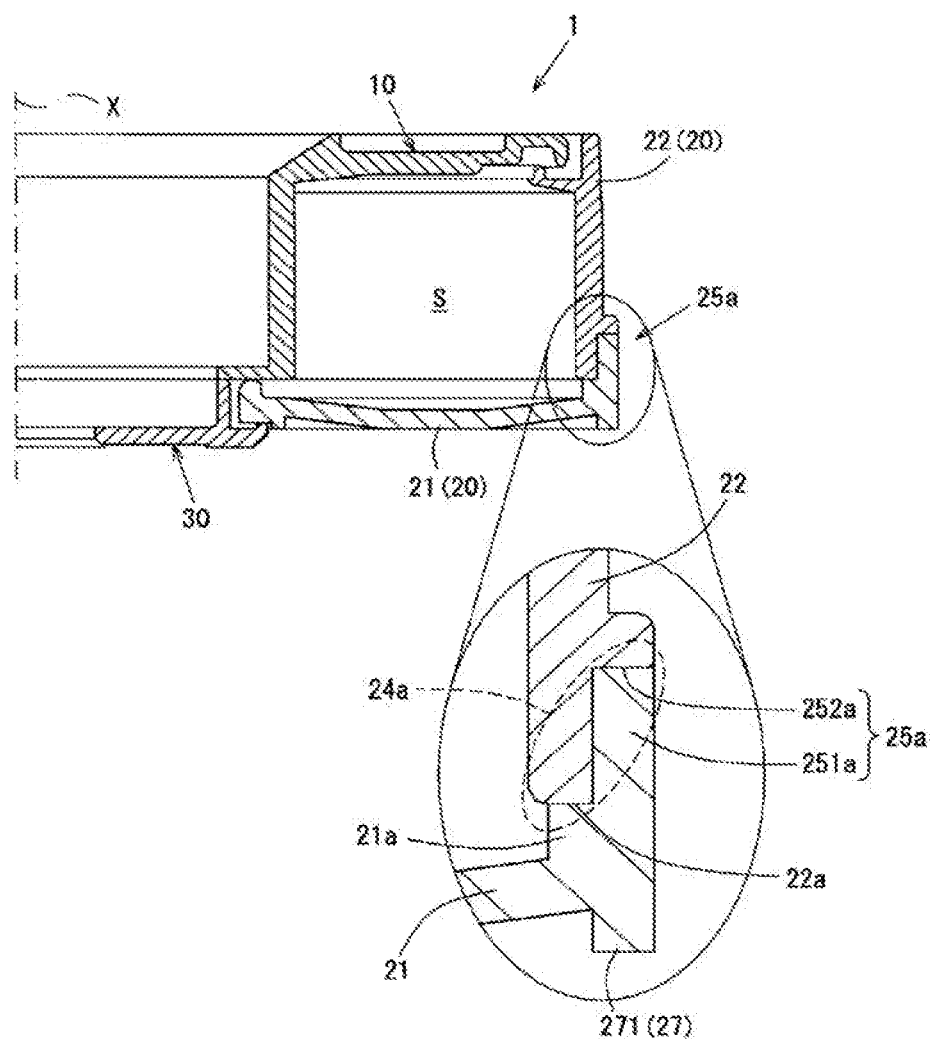
FIG. 9 is a schematic cross-sectional view of a recess-protrusion fitting portion of another embodiment.

For example, as described above, the recess-protrusion fitting portion 25 need not be configured by the main body side fitting recess 251 formed in the stator main body 21 and the sub-side fitting protrusion 252 formed on the sub stator 22, but as illustrated in FIG. 9, the recess-protrusion fitting portion 25a may be configured by a main body side fitting protrusion 251a having a convex shape that protrudes upward from the outer peripheral edge portion 21a of the stator main body 21 and a sub-side fitting recess 252a having a concave shape in which the bottom surface 22a of the sub stator 22 is recessed.

It should be noted that FIG. 9 is an explanatory view of the recess-protrusion fitting portion 25a configured by the main body side fitting protrusion 251a and the sub-side fitting recess 252a. More specifically, FIG. 9 illustrates a schematic cross-sectional view of the SRC 1 taken along the line B-B in FIG. 4, and also illustrates an enlarged view of the periphery of the recess-protrusion fitting portion 25a in the cross-sectional view.

Further, in this case and in the above-described embodiment, as illustrated in FIG. 9, the plate thickness of the lower end side of the sub stator 22 may be set such that the length in the radial direction of the radial cross section of the opposing portion 24a that corresponds to the recess-protrusion fitting portions 25 and 25a is longer than the plate thickness of the sub stator 22.

In addition, the present invention is not limited to providing the recess-protrusion fitting portion 25 or the overlapping protrusion 27 for extending the length of the opposing portion 24 along the radial cross section, and a plate-shaped body extending to the radial inner side along the stator main body 21 may be provided from the lower end of the sub stator 22, or the opposing portion 24 in which the stator main body 21 and the sub stator 22 oppose each other may be inclined in a tapered shape along the radial cross section.

In addition, the main body side fitting recess 251 and the sub-side fitting protrusion 252 may be formed not only in a rectangular shape, but may be formed in a curved shape, or a combination of a rectangular shape and a curved shape may be used, provided that they are capable of recess-protrusion fitting with each other.

In addition, the present invention is not limited to fixing the loop-back portion Fu to the cable fixing portion 26, and a plate-shaped body made of a synthetic resin may be fixed thereon, for example, and a packing made of silicone or rubber, or grease may be interposed in the opposing portion 24.

In addition, another embodiment of the present invention will be described with reference to FIG. 10 to FIG. 13.

Figure 10:
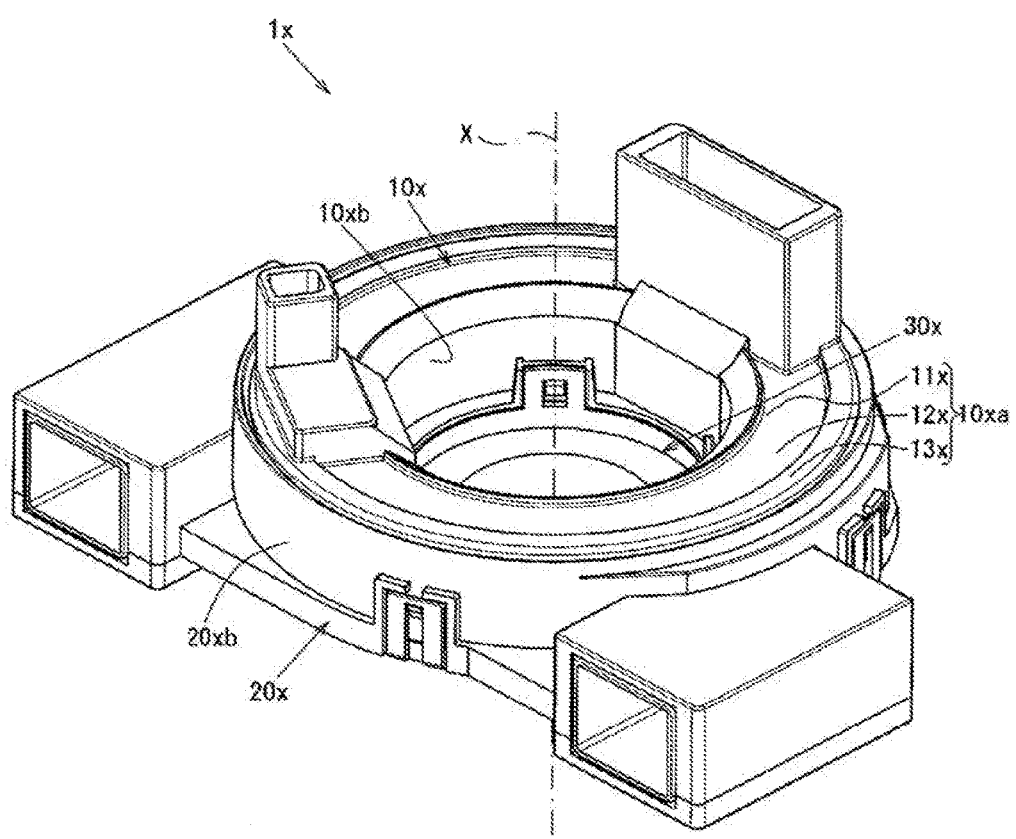
FIG. 10 is a schematic perspective view of the rotary connector device.
Figure 11:
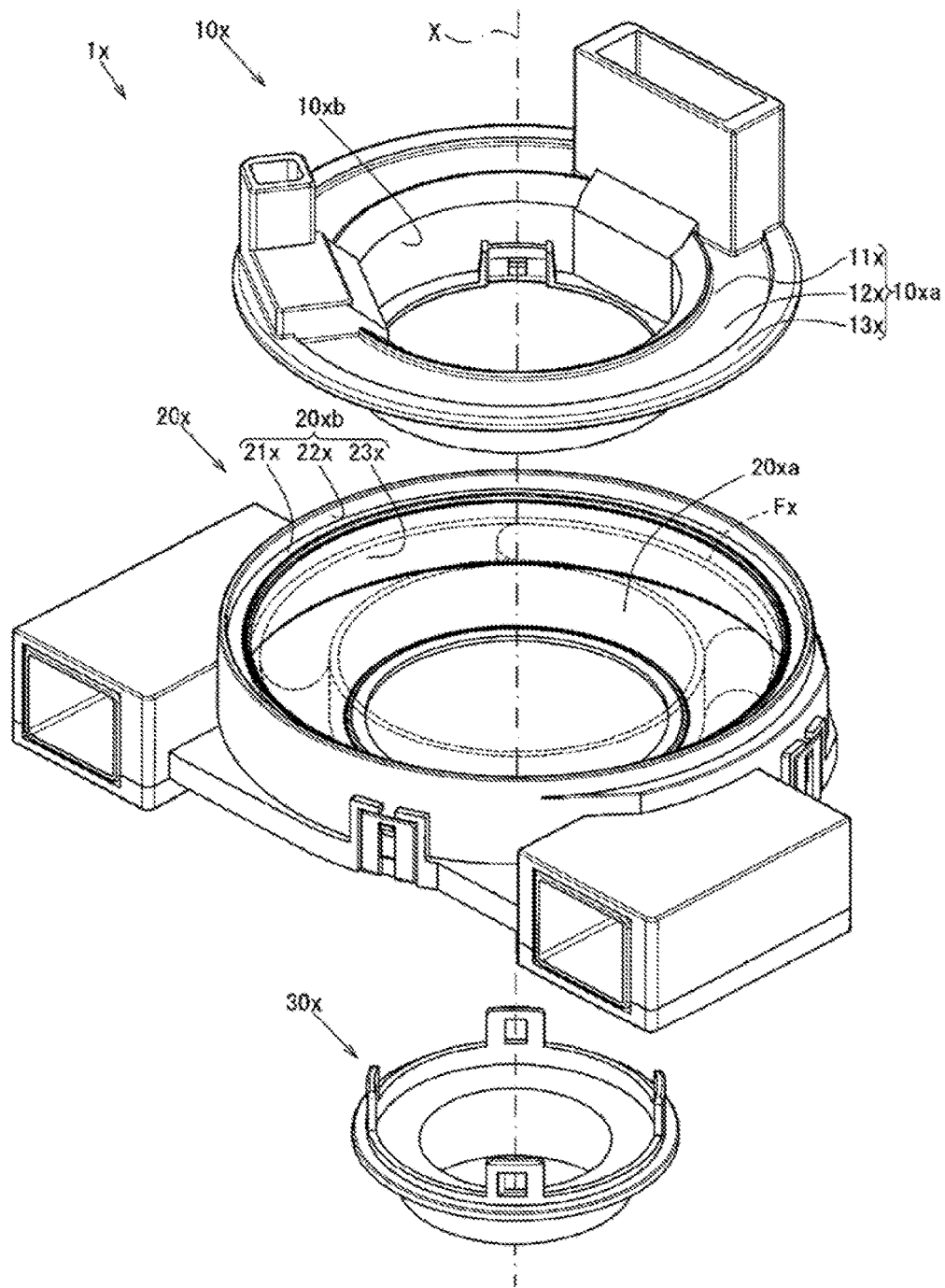
FIG. 11 is a schematic exploded perspective view of the rotary connector device.
Figure 12:
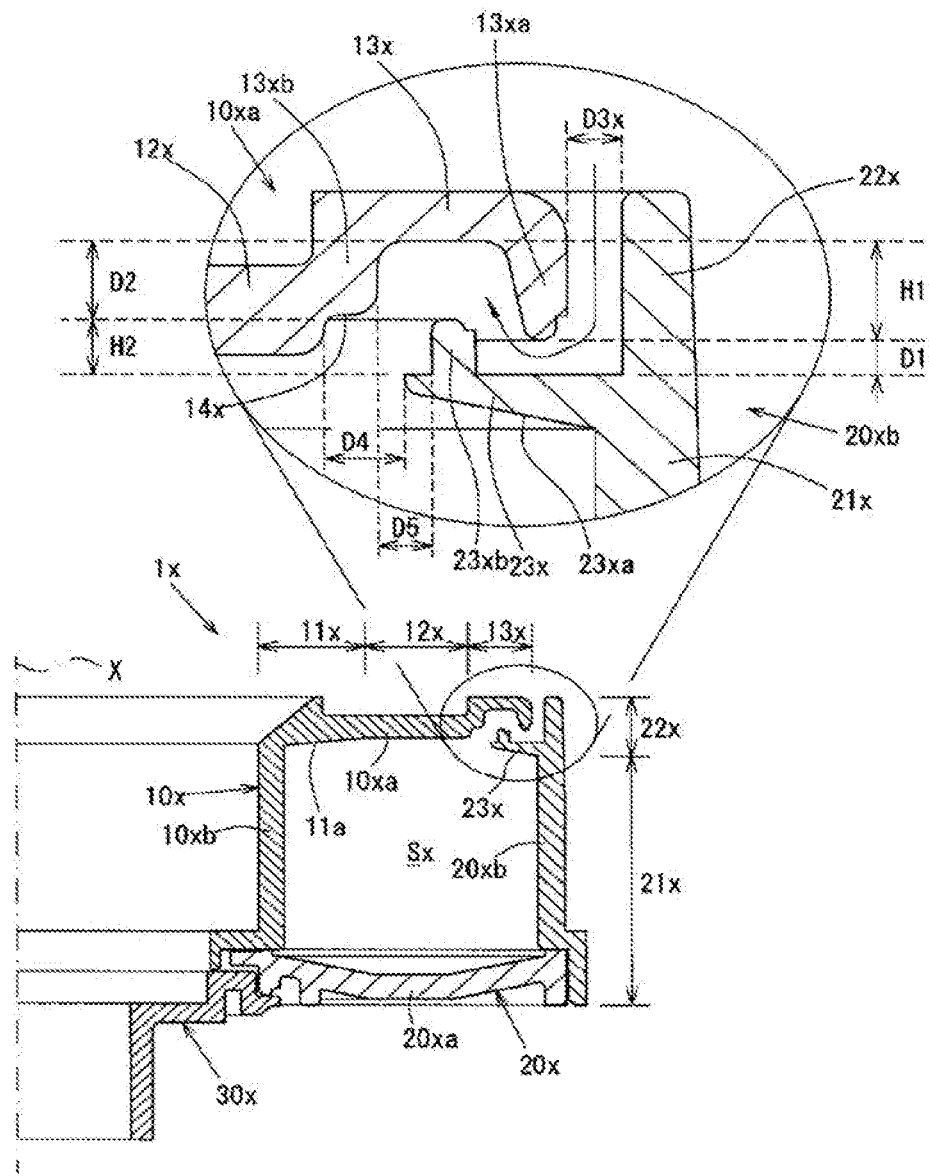
FIG. 12 is a schematic cross-sectional view of the rotary connector device.

FIG. 10 illustrates a schematic perspective view of the rotary connector device 1x (a steering roll connector hereinafter referred to as SRC 1x) as viewed from upward, FIG. 11 illustrates a schematic exploded perspective view of the SRC 1x as viewed from upward, and FIG. 12 illustrates a schematic cross-sectional view of a single cross-section of the SRC 1x and an enlarged view of the periphery of the outer peripheral edge portion 13x and the upper end portion 22x in the cross-sectional view.

Figure 13:
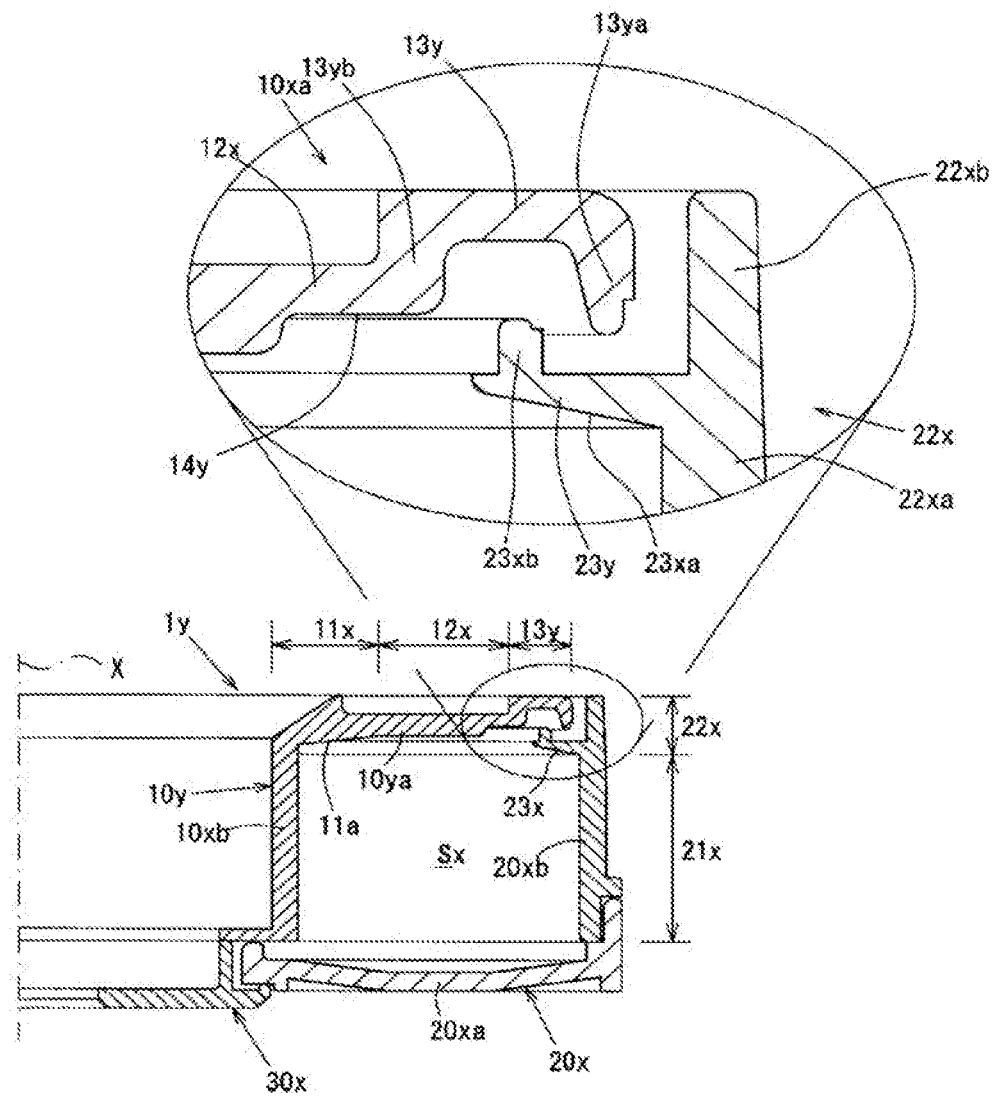
FIG. 13 is a schematic cross-sectional view of a rotary connector device according to another embodiment.

It should be noted that FIG. 11 illustrates the flat cable Fx in a transparent state, and FIG. 12 and FIG. 13 illustrate an SRC 1x in which the left side of the central axis X is omitted.

In addition, in the present embodiment, with the stator 20x set as a reference, the rotator 10x side is defined as the upward side and the sleeve 30x side is defined as the downward side. Also, in the SRC 1x viewed from upward, the right-side rotation direction is as the clockwise direction and the left-side rotation direction is set as the counterclockwise direction.

As illustrated in FIG. 10 and FIG. 11, the SRC 1x according to the present invention is configured by assembling, in the following order, a rotator 10x that follows the steering of a steering wheel (omitted in the drawings), a stator 20x fixed to the steering column (omitted in the drawings), and a sleeve 30x fixed to the rotator 10x along the central axis X.

In the SRC 1x, the rotator 10x and the sleeve 30x are assembled to be relatively rotatable with respect to the stator 20x in both the clockwise direction and the counterclockwise direction with the central axis X as the rotation center, and a wound flat cable Fx is housed in an annular housing space Sx formed therein.

As illustrated in FIG. 11, in the rotator 10x, an annular, substantially flat top plate 10xa that configures the upper surface of the SRC 1x and a substantially cylindrically shaped inner peripheral portion 10xb that protrudes downward from the inner edge of the top plate 10xa and configures the inner peripheral surface of the SRC 1x are configured as a single unit.

As illustrated in FIG. 12, the top plate 10xa that configures the rotator 10x is formed with an outer diameter that is one size smaller than that of the outer peripheral portion 20xb of the stator 20x described later, and is configured by arranging, from the radial inner side to the radial outer side, an inner peripheral edge portion 11x, a top plate main body 12x, and an outer peripheral edge portion 13x in the described order.

The top plate main body 12x is formed in a substantially flat shape, and the inner peripheral edge portion 11x is formed in a tapered cross-section shape that has an inclined surface 11xa inclined downward toward the radial inner side in the radial cross section.

The outer peripheral edge portion 13x is formed in an annular, flat shape whose bottom surface substantially coincides with the upper surface of the top plate main body 12x, a rotator side protrusion 13xa that protrudes downward is provided at the outer edge, and a connecting portion 13xb that protrudes downward and connects with the outer edge of the top plate main body 12x is provided at the inner edge. That is, the outer peripheral edge portion 13x is formed in a substantially concave shape protruding upward by the rotator side protrusion 13xa and the connecting portion 13xb. It should be noted that the radial length of the outer peripheral edge portion 13x is formed to be approximately twice the radial length of the inner peripheral edge portion 11x and the top plate main body 12x.

The rotator side protrusion 13xa protrudes downward by a predetermined length, has a downward tip formed in a circular arc cross section, and is an annular, substantially cylindrical body formed around the entire periphery of the tip of the outer peripheral edge portion 13x. It should be noted that the predetermined length is defined as the protruding length H1.

In the top plate 10xa configured as described above, the radial outer side of the top plate main body 12x and the connecting portion 13xb of the outer peripheral edge portion 13x are connected in the radial direction, and a notch portion 14x formed by cutting a bottom surface of the connecting portion 13xb into a substantially rectangular shape is formed.

The notch portion 14x has a length in the radial direction that is equal to the thickness of the connecting portion 13xb, and the notch amount is approximately half the thickness of the top plate main body 12x.

As illustrated in FIG. 11, the stator 20x is configured by an annular, substantially flat bottom plate 20xa that configures the bottom surface of the SRC 1x, and a substantially cylindrical outer peripheral portion 20xb that protrudes upward from the outer edge of the bottom plate 20xa and configures the outer peripheral surface of the SRC 1x.

As illustrated in FIG. 12, in the outer peripheral portion 20xb that configures the stator 20x, an outer peripheral portion main body 21x and an upper end portion 22x are disposed and configured by the downward side to the upward side, and an annular, substantially flat protruding annular portion 23x that protrudes to the radial inner side from the downward side of the upper end portion 22x is provided. Put differently, in the outer peripheral portion 20xb, the upward of the protruding annular portion 23x is defined as the upper end portion 22x.

The outer peripheral portion main body 21x is a cylindrical body that extends upward from the outer edge of the bottom plate 20xa, and is formed with a predetermined plate thickness. In this way, the outer peripheral portion main body 21x can have a constant mechanical strength.

The upper end portion 22x is a cylindrical body whose outer diameter is identical to the outer diameter of the outer peripheral portion main body 21x, and which is formed to a plate thickness of approximately two-thirds of that of the outer peripheral portion main body 21x.

In the assembled state of the SRC 1x, the upper end portion 22x is formed such that the apex thereof substantially coincides with the upper surface of the top plate 10xa.

It should be noted that, in the assembled state of the SRC 1x, since the upper end portion 22x formed to a plate thickness of approximately two-thirds of that of the outer peripheral portion main body 21x can be provided with a spacing D3 between the upper end portion 22x and the rotator side protrusion 13xa, relative rotation of the rotator 10x with respect to the stator 20x can be smoothly performed, and the weight of the stator 20x can be reduced.

The protruding annular portion 23x is formed in a tapered cross-section having an inclined surface 23xa inclined upward toward the radial inner side, and is provided with a stator side protruding portion 23xb that protrudes slightly upward from the radial outer side from the tip.

That is, the tip of the protruding annular portion 23x protrudes slightly more toward the radial inner side than the stator side protruding portion 23xb such that a spacing D4 is opened in the radial direction in between the surface of the radial inner side of the notch portion 14x in the assembled state of the SRC 1x. It should be noted that the spacing D4 between the tip of the protruding annular portion 23x and the surface of the radial inner side of the notch portion 14x is wider than the above-described spacing D3 between the upper end portion 22x and the rotator side protrusion 13xa (D3<D4).

The stator side protruding portion 23xb is an annular, substantially cylindrical body formed around the entire periphery of the tip side of the protruding annular portion, and in which the protruding length H2 that protrudes upward is shorter than the protruding length H1 of the rotator side protrusion 13xa (H1>H2). It should be noted that the spacing D5 in the radial direction between the stator side protruding portion 23xb and the connecting portion 13xb in the assembled state of the SRC 1x is wider than the spacing D3 between the above-mentioned upper end portion 22x and the rotator side protrusion 13xa (D3<DS).

As illustrated in FIG. 11, the sleeve 30x is formed in a substantially cylindrical shape, is disposed on the side opposite to the rotator 10x with respect to the stator 20x, and is fixed to the rotator 10x from the downward side to interpose the stator 20x.

In a state in which the rotator 10x and the sleeve 30x configured as described above are assembled to be relatively rotatable with respect to the stator 20x, the upper surface of the protruding annular portion 23x is opposed parallel to the bottom surface of the outer peripheral edge portion 13x.

Furthermore, in the upper portion of the SRC 1x, the upper end portion 22x, the rotator side protrusion 13xa, and the stator side protruding portion 23xb are disposed in the described order from the radial outer side to the radial inner side.

Specifically, the rotator side protrusion 13xa opposes the approximate center of the radial direction of the protruding annular portion 23x, and the stator side protruding portion 23xb opposes the approximate center of the radial direction of the outer peripheral edge portion 13x.

In this configuration, the opposing distance D1 between the rotator side protrusion 13xa and the protruding annular portion 23x is shorter than the opposing distance D2 between the stator side protruding portion 23xb and the outer peripheral edge portion 13x.

That is, between the outer peripheral edge portion 13x disposed in parallel to the up-down direction and the protruding annular portion 23x, the tip of the rotator side protrusion 13xa protrudes further downward than the apex of the upper end portion 22x and the tip of the stator side protruding portion 23xb.

Also, further, as described above, the spacing D3 between the rotator side protrusion 13xa and the upper end portion 22x is narrower than the interval D4 between the end portion of the radial inner side of the protruding annular portion 23x and the surface of the radial inner side of the notch portion 14x (D3<D4), and is also narrower than the interval D5 between the stator side protruding portion 23xb and the connecting portion 13xb (D3<D5).

In the SRC 1x configured as described above, the upper end portion 22x, the rotator side protrusion 13xa, and the stator side protruding portion 23xb are disposed in the described order from the radial outer side toward the radial inner side. Since the tip of the SRC 1x protrudes further downward than the tips of the upper end portion 22x and the stator side protruding portion 23xb, and a rotator side protrusion 13xa is provided in which the protruding length H1 is longer than the protruding length H2 of the stator side protruding portion 23xb (H1>H2), it is possible to prevent foreign matter such as dirt and dust from entering into the housing space Sx without an increase in the size.

Specifically, by forming the rotator side protrusion 13xa such that its tip protrudes further downward than the tips of the upper end portion 22x and the stator side protruding portion 23xb, since the intrusion path of the foreign matter that enters the housing space Sx from the outside extends downward between the upper end portion 22x and the rotator side protrusion 13xa and deflects in a substantial U-shape to extend between the rotator side protrusion 13xa and the stator side protruding portion 23xb (see the arrow in FIG. 12), it is possible to restrict the entry of the foreign matter into the housing space Sx directly along the radial direction.

More particularly, as the upper end portion 22x is disposed on the radial outer side of the gap between the rotator side protrusion 13xa and the protruding annular portion 23x, it is possible to reduce the amount of foreign matter that reaches the rotator side protrusion 13xa. Further, even in cases where the foreign matter reaches the rotator side protrusion 13xa, since the protruding length H1 of the rotator side protrusion 13xa is longer than the protruding length H2 of the stator side protruding portion 23xb, it is possible to restrict the foreign matter from entering into the housing space Sx from the rotator side protrusion 13xa.

Even supposing that the foreign matter entered into the housing space Sx side from the rotator side protrusion 13xa, the foreign matter needs to overcome the stator side protrusion 23xb that protrudes from the protruding annular portion 23x toward the top plate 10xa.

By providing such a rotator side protrusion 13xa, a protruding annular portion 23x, and a stator side protrusion 23xb, it is possible to prevent the entry of foreign matter into the housing space Sx.

In contrast, since the outer peripheral portion 20xb does not have a two-layer structure as in the related art, but has a single layer structure, it is possible to prevent the entry of the foreign matter into the housing space Sx without increasing the size of the SRC 1x in the radial direction.

In addition, even in a case where the protruding annular portion 23x deflects or vibrates with the base end, which is the radial outer side, as a fulcrum, since the protruding length H1 of the rotator side protrusion 13xa is formed to be longer than the protruding length H2 of the stator side protruding portion 23xb (H1>H2), the rotator side protrusion 13xa abut against the protruding annular portion 23x before the stator side protruding portion 23xb abuts against the outer peripheral edge portion 13x.

In this configuration, the location where the rotator side protrusion 13xa of the protruding annular portion 23x abuts is a base end side having a smaller deflection amount than the arrangement location of the stator side protruding portion 23xb of the protruding annular portion 23x.

Put differently, in a case where the stator side protruding portion 23xb and the outer peripheral edge portion 13x abut each other, and in a case where the protruding annular portion 23x and the rotator side protrusion 13x abut each other, since the former abuts with the tip side of the protruding annular portion 23x having a large deflection amount, sliding sounds caused by the relative rotation in the abutting state and abnormal noise such as abutting sounds due to vibration are likely to be generated, and the abnormal noise that is generated here grows louder. For this reason, the protruding length H1 of the rotator side protrusion 13xa is formed to be longer than the protruding length H2 of the stator side protruding portion 23xb (H1>H2) so that the rotator side protrusion 13xa abuts with the protruding annular portion 23x before the stator side protruding portion 23xb abuts with the outer peripheral edge portion 13x.

In this way, the SRC 1x of the present embodiment is capable of not only preventing the entry of foreign matter into the housing space Sx without an increase in size, but can also prevent the generation of abnormal noise when components are brought to abut each other.

In addition, in the present embodiment, by forming the apex of the outer peripheral portion 20xb to have a height that is approximately equal to that of the top plate 10xa, it is possible to reliably restrict the entry of foreign matter into the housing space Sx from the radial direction, and to prevent the relative rotational performance of the SRC 1x from deteriorating.

Specifically, since the apex of the outer peripheral portion 20xb that is formed to have the same height as the top plate 10xa does not protrude further upward than the top plate 10xa, it is possible to prevent the apex of the outer peripheral portion 20xb of the stator 20x fixed to the steering column from interfering with the rotation of the steering wheel.

Furthermore, even in cases when the rotator 10x relatively tilts with respect to the stator 20x, or the rotator 10x and the stator 20x are relatively deformed, by means of the outer peripheral portion 20xb which is formed to have approximately the same height as the top plate 10xa, it is possible to prevent the rotator side protrusion 13xa from passing over the upper end portion 22x and jutting out in the radial outer side or interfering.

In this way, it is possible to prevent interference between the apex of the outer peripheral portion 20xb and the steering wheel, as well as deterioration of the relative rotational performance of the SRC 1x that is capable of preventing interference between the upper end portion 22x and the rotator side protrusion 13xa.

In addition, by means of the outer peripheral portion 20xb of which apex is formed to have approximately the same height as the top plate 10xa, it is possible to restrict the entry of foreign matter into the housing space Sx from the radial outer side more reliably than the upper end portion 22x.

As described above, the SRC 1x according to the present embodiment can reliably restrict the foreign matter from entering the housing space Sx from the radial direction, and can prevent deterioration of the relative rotational performance.

In addition, in the present embodiment, by forming the protruding annular portion 23x to have a tapered cross-section in which it is gradually thinning toward the tip, since the protruding annular portion 23x becomes easily deflected toward the tip, the protruding annular portion 23x that is abutted and compressed against the rotator side protrusion 13xa can reduce the contact resistance by deflecting due to the compressing force.

Accordingly, it is possible to reliably prevent the relative rotational performance of the SRC 1x from deteriorating, and it is also possible to reliably prevent the protruding annular portion 23x from being damaged by the compression of the rotator side protrusion 13xa. Furthermore, it is possible to reduce the weight of the protruding annular portion 23x.

In addition, in the present embodiment, by forming the tip of the downward side of the rotator side protrusion 13xa into a circular arc cross section, even supposing a case in which the rotator side protrusion 13xa and the protruding annular portion 23x are in contact with each other, as this is a point-contact state in the radial cross section, it is possible to reliably reduce the contact resistance. Accordingly, it is possible to more reliably prevent the relative rotational performance of the SRC 1x from deteriorating.

In addition, in the present embodiment, by forming the notch portion 14x on the bottom surface of the connecting portion between the top plate main body 12x and the outer peripheral edge portion 13x, even supposing that the protruding annular portion 23x deflects, it is possible to prevent the tip of the protruding annular portion 23x that slightly protrudes from the stator side protruding portion 23xb toward the radial inner side from interfering with the top plate 10xa.

Specifically, as described above, the spacing D3 between the rotator side protrusion 13xa and the upper end portion 22x is narrower than the interval D4 between the end portion of the radial inner side of the protruding annular portion 23x and the surface of the radial inner side of the notch portion 14x (D3<D4), and is also narrower than the interval D5 between the stator side protruding portion 23xb and the connecting portion 13xb (D3<D5).

Accordingly, even in a case where the stator 20x deforms relatively with respect to the rotator 10x, the rotator side protrusion 13xa and the upper end portion 22x abut each other before the end portion of the radial inner side of the protruding annular portion 23x and the surface of the radial inner side of the notch portion 14x or the stator side protruding portion 23xb and the connecting portion 13xb, and it is possible to prevent the protruding annular portion 23x from being damaged due to the abutting.

In addition, in the present embodiment, by inclining the radially inclined surface 11a of the inner peripheral edge portion 11x upward toward the radial outer side, it is possible to guide the movement of the flat cable Fx, which is wound and unwound in accordance with the relative rotation of the SRC 1x, from the radial inner side toward the radial outer side. Also, by inclining the radially inclined surface 23a of the protruding annular portion 23x upward toward the radial inner side, it is possible to guide the movement of the flat cable Fx from the radial outer side to the radial inner side due to the relative rotation of the SRC 1x.

In particular, the inclined surface 23xa of the protruding annular portion 23x for guiding the movement of the flat cable Fx is also capable of suppressing entry of the flat cable Fx into the gap between the protruding annular portion 23x and the outer peripheral edge portion 13x that rotate relative to each other.

In the correspondence between the configuration of the present invention and the above-described embodiment, the rotary connector device of the present invention corresponds to the SRC 1x of the embodiment, and similarly:

the rotating body corresponds to the rotator 10x, the rotating side ring plate corresponds to the top plate 10xa, the inner cylindrical portion corresponds to the inner peripheral portion 10b, the rotator side protrusion corresponds to the rotator side protrusion 13xa the stationary body corresponds to the stator 20x, the stationary side ring plate corresponds to the bottom plate 20xa, the outer peripheral cylindrical portion corresponds to the outer peripheral portion 20xb, the apex side edge portion corresponds to the upper end portion 22x, the protruding ring plate corresponds to the protruding annular portion 23x, the stationary side protrusion corresponds to the stator side protruding portion 23xb, the protruding length of the rotator side protrusion corresponds to the protruding length H1, and the protruding length of the stationary side protrusion corresponds to the protruding length H2, but the present invention is not limited only to the configuration of the above-described embodiment, and many embodiments can be obtained.

For example, the surface of the radial inner side of the notch portion 14y that is formed on the bottom surface of the connecting portion between the top plate main body 12y and the outer peripheral edge portion 13y may be shifted toward the central axis X. That is, the length in the radial direction of the notch portion 14y may be extended toward the radial inner side as illustrated in FIG. 13. This extended length can be appropriately set according to the ratio of the length of the housing space Sx in the up-down direction and the length in the radial direction.

It should be noted that, FIG. 13 illustrates a schematic cross-sectional view of a single cross section of an SRC 1y of another embodiment and an enlarged view of the periphery of the outer peripheral edge portion 13y and the upper end portion 22x in the cross-sectional view.

Specifically, as in the SRC 1x of the present embodiment illustrated in FIG. 12, in contrast to the fact that the length of the housing space Sx in the up-down direction and the length in the radial direction are substantially equal, as the other SRC 1y illustrated in FIG. 13, in the case that the length of the housing space Sx in the radial direction is longer than the length in the up-down direction, the rotator 10y tilts relatively with respect to the stator 20x, or alternatively, the relative deformation amount of the rotator 10y and the stator 20x increases. In contrast to this, by appropriately extending the length in the radial direction of the notch portion 14y, it is possible to prevent the tip of the protruding annular portion 23x from interfering with the top plate 10y.

In addition, according to the above-described present embodiment, the outer peripheral edge portion 13x is connected to the upper surface of the top plate main body 12x, but the present embodiment is not limited herein, and the outer peripheral edge portion 13x may be connected flush with the top plate main body 11c, or may be connected to the bottom surface of the top plate main body 12x.

REFERENCE SIGNS LIST

1 SRC
10 Rotator
11 Top plate
12 Inner peripheral portion
20 Stator
21 Stator main body
22 Sub stator
222 Surrounding portion
23 Stator locking portion
231 Frame-shaped locking portion
232 Protruding locking portion
24 Opposing portion
25 Recess-protrusion fitting portion
251 Main body side fitting recess
252 Sub-side fitting protrusion
26 Cable fixing portion
261 Main body side fixing recess
262 Sub-side fixing recess
30 Sleeve
F Flat cable
Fu Loop-back portion
S Housing space
L1 Spacing
L2 Fitting length
1x, 1y SRC
10x, 10y Rotator
10xa, 10ya Top plate
10xb Inner peripheral portion
13x, 13y Outer peripheral edge portion
13xa, 13ya Rotator side protrusion
20x Stator
20xa Bottom plate
20xb Outer peripheral portion
22x Upper end portion
23x Protruding annular portion
23xa Stator side protruding portion
H1, H2 Protruding length
Sx Housing space

The invention claimed is:

1. A rotary connector device, comprising:
a rotating body having an annular rotating ring plate and a cylindrically shaped inner cylindrical portion formed on an inner peripheral edge of the rotating ring plate;
a stationary body having an annular stationary ring plate and a cylindrically shaped outer peripheral cylindrical portion abutting against an outer peripheral edge of the stationary ring plate in an axial direction, the stationary body being assembled with the rotating body such that the stationary body and the rotating body are relatively rotatable in both a clockwise direction and a counter-clockwise direction;
a flat cable being wound and housed in a housing space formed inside;
a locking portion extending from the stationary ring plate disposed along an outer peripheral surface of the outer peripheral cylindrical portion;
a locking unit that enables locking of an engaging portion formed on the outer peripheral cylindrical portion; and
a foreign matter intrusion suppression unit that suppresses entry of foreign matter into the housing space,
wherein the foreign matter intrusion suppression unit is disposed at a location corresponding to at least the locking unit of an opposing portion between the stationary ring plate and the outer peripheral cylindrical portion.

2. The rotary connector device according to claim 1, wherein the foreign matter intrusion suppression unit includes:
a fitting protrusion that is formed on at least one of the stationary ring plate and the outer peripheral cylindrical portion and protrudes toward another one; and
a fitting recess that is formed on the other one and that engages with the fitting protrusion.

3. The rotary connector device according to claim 2, wherein the fitting recess is formed on the stationary ring plate, the fitting protrusion is formed on the outer peripheral cylindrical portion, and the foreign matter intrusion suppression unit is disposed on a radial outer side of the opposing portion.

4. The rotary connector device according to claim 2, wherein in a state in which the fitting protrusion and the fitting recess are recess-protrusion fitted to bond with each other in the axial direction, a fitting length of the fitting protrusion and the fitting recess in the axial direction is longer than a spacing in the axial direction formed between the locking portion and the engaging portion.

5. The rotary connector device according to claim 1, wherein the foreign matter intrusion suppression unit comprises a blocking member configured to block the opposing portion in a radial direction.

6. The rotary connector device according to claim 5, wherein
a stationary recess is formed on each opposing surface of the stationary ring plate and the outer peripheral cylindrical portion, and
the blocking member comprises a stationary blocking member being fixed to both stationary recesses straddling the opposing portion in the axial direction.

7. The rotary connector device according to claim 6, wherein the stationary blocking member is a part of the flat cable housed in the housing space.

8. The rotary connector device according to claim 1, further comprising:
a surrounding portion surrounding a periphery of the locking portion along the outer peripheral surface and being formed on the outer peripheral cylindrical portion.

9. The rotary connector device according to claim 3, wherein in a state in which the fitting protrusion and the fitting recess are recess-protrusion fitted to bond with each other in the axial direction, a fitting length of the fitting protrusion and the fitting recess in the axial direction is longer than a spacing in the axial direction formed between the locking portion and the engaging portion.

10. A rotary connector device, comprising:
a rotating body having an annular rotating ring plate and a cylindrically shaped inner cylindrical portion formed on an inner peripheral edge of the rotating ring plate;
a stationary body having an annular stationary ring plate and a cylindrically shaped outer peripheral cylindrical portion formed on an outer peripheral edge of the stationary ring plate, the stationary body being assembled with the rotating body such that the stationary body and the rotating body are relatively rotatable in both a clockwise direction and a counterclockwise direction, and that a housing space is included inside;
an annular rotator side protrusion protruding from the outer peripheral edge portion of the outer peripheral edge side of the rotating ring plate toward the stationary ring plate;
an annular protruding ring plate protruding to a radial inner side from the stationary ring plate at an upper end portion of the outer peripheral edge portion; and
an annular stationary side protrusion protruding from the protruding ring plate toward the rotating ring plate,
wherein the upper end portion, the rotator side protrusion, and the stationary side protrusion are disposed in the described order from a radial outer side to a radial inner side,
the rotator side protrusion has a tip thereof protruding toward the stationary ring plate beyond the upper end portion and the tip of the stationary side protrusion,
a protruding length of the rotator side protrusion is longer than a protruding length of the stationary side protrusion, and
the protruding ring plate has a tapered cross-section being gradually thinning toward a tip.

11. The rotary connector device according to claim 10, wherein the outer peripheral cylindrical portion has a height such that an apex portion is substantially equal to the rotating ring plate.

12. The rotary connector device according to claim 10, wherein a tip of the rotator side protrusion is formed in a circular arc cross section.

* * * * *